US008041877B2

(12) United States Patent
Nevarez et al.

(10) Patent No.: US 8,041,877 B2
(45) Date of Patent: Oct. 18, 2011

(54) DISTRIBUTED COMPUTING UTILIZING VIRTUAL MEMORY HAVING A SHARED PAGING SPACE

(75) Inventors: David Nevarez, Austin, TX (US); Veena Patwari, Austin, TX (US); Jacob J. Rosales, Austin, TX (US); Morgan J. Rosas, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 12/135,762

(22) Filed: Jun. 9, 2008

(65) Prior Publication Data
US 2009/0307435 A1 Dec. 10, 2009

(51) Int. Cl.
*G06F 12/02* (2006.01)
(52) U.S. Cl. ............ 711/6; 711/147; 711/E12.002
(58) Field of Classification Search .......... 711/147, 711/E12.002
See application file for complete search history.

(56) References Cited

U.S. PATENT DOCUMENTS

| | | | |
|---|---|---|---|
| 5,592,625 A | 1/1997 | Sandberg | |
| 5,893,922 A * | 4/1999 | Baylor et al. | 711/148 |
| 6,148,377 A | 11/2000 | Carter et al. | |
| 7,069,413 B1 | 6/2006 | Agesen et al. | |
| 7,222,221 B1 | 5/2007 | Agesen et al. | |
| 7,376,808 B2 | 5/2008 | Cascaval et al. | |
| 7,506,122 B1 * | 3/2009 | Agesen et al. | 711/163 |
| 7,680,987 B1 | 3/2010 | Clark et al. | |
| 7,783,838 B1 | 8/2010 | Agesen et al. | |
| 2002/0120807 A1 | 8/2002 | Sutherland et al. | |
| 2003/0212922 A1 | 11/2003 | Nagasuka et al. | |
| 2005/0050292 A1 | 3/2005 | Oh | |
| 2005/0055419 A1 | 3/2005 | Oh | |
| 2006/0041733 A1 | 2/2006 | Hyser | |
| 2006/0067318 A1 | 3/2006 | Gorodetsky et al. | |
| 2006/0218536 A1 | 9/2006 | Kirilline et al. | |
| 2006/0250945 A1 * | 11/2006 | Fernandes et al. | 370/216 |
| 2006/0288034 A1 | 12/2006 | Do et al. | |
| 2007/0118712 A1 | 5/2007 | van Riel et al. | |
| 2007/0143315 A1 | 6/2007 | Stone | |
| 2007/0168496 A1 | 7/2007 | Bansod et al. | |
| 2008/0005489 A1 * | 1/2008 | Watkins et al. | 711/147 |
| 2008/0005522 A1 | 1/2008 | Paladini et al. | |
| 2008/0127221 A1 | 5/2008 | Otte et al. | |
| 2008/0168235 A1 | 7/2008 | Watson et al. | |

(Continued)

OTHER PUBLICATIONS

Rui Chu, et al., "A Distributed Paging RAM Grid System for Wide-Area Memory Sharing," Parallel and Distributed Processing Symposium, 2006, IPDPS 2006, 20th International, pp. 10.

(Continued)

*Primary Examiner* — Mardochee Chery
(74) *Attorney, Agent, or Firm* — Stephen J. Walder, Jr.; Libby Z. Toub

(57) ABSTRACT

A method for distributed computing utilizing virtual memory is disclosed. The method can include identifying a first node to process an application, identifying paging space accessible to the first node, identifying a second node to share paged data with the first node, and transacting the paged data between the first node and the identified paging space. Thus, application processing results from the first node can be stored in paging space and a second node can retrieve the first result from the paging space such that the paging space can be shared between nodes. Other embodiments are also disclosed.

23 Claims, 10 Drawing Sheets

U.S. PATENT DOCUMENTS

| | | | |
|---|---|---|---|
| 2008/0168479 | A1 | 7/2008 | Purtell et al. |
| 2008/0270711 | A1 | 10/2008 | Kwon et al. |
| 2009/0164715 | A1 | 6/2009 | Astigarraga et al. |
| 2009/0204786 | A1* | 8/2009 | Igarashi et al. ............... 711/209 |
| 2009/0307460 | A1 | 12/2009 | Nevarez et al. |

OTHER PUBLICATIONS

Y. Kermarrec, et al., "Integrating Page Replacement in a Distributed Shared Virtual Memory," Distributed Computing Systems, 1994, Proceedings of the 14$^{th}$ International Conference, pp. 8.

P. Werstein, et al., "A Remote Memory Swapping System for Cluster Computers," Parallel and Distributed Computing, Applications and Technologies, 2007, PDCAT '07, Eighth International Conference, pp. 7.

Ming Zhao, et al., "Distributed File System Support for Virtual Machines in Grid Computing," High Performance Distributed Computing, 2004. Proceedings, 13$^{th}$ IEEE International Symposium, pp. 10.

Qingkui Chen, et al., "Parallel Cache Model Based on Grid Memory," Network and Parallel Computing Workshops, 2007, NPC Workshops, IFIP International Conference, pp. 6.

Radha, S., et al., "Remote Memory Management and Prefetching Techniques for Jobs in Grid," Semantics, Knowledge and Grid, 2006, SKG '06, Second International Conference, pp. 6.

USPTO Application U.S. Appl. No. 12/135,883, Image File Wrapper printed May 19, 2011, 2 pages.

"Extending Virtualization in the Data Center with Application Infrastructure Virtualization: Introducing WebSphere Virtual Enterprise", IBM White Paper, 2008, p. 16.

Demers, Alan et al., "The Bayou Architecture: Support for Data Sharing Among Mobile Users", IEEE, 1995, p. 6.

* cited by examiner

DISTRIBUTED COMPUTING UTILIZING VIRTUAL MEMORY HAVING A SHARED PAGING SPACE

BACKGROUND OF THE DISCLOSURE

The present disclosure relates generally to computers. More particularly, the present disclosure relates to operation and uses for virtual memory sharing.

Many large, computer systems can simultaneously run multiple operating systems (OSs). One issue with such arrangement is effectively allocating system resources to the multiple OSs. Some computers that support multiple OSs fix resource allocations for each OS, where the allocations do not change over time. More complex computer systems can dynamically allocate resources based on the needs of each OS.

Virtualizing memory functions has become a topic of great interest. Virtualizing memory can be done many ways. One way is by "paging" memory or swapping memory, where underutilized information stored in high performance memory is flushed out or moved to a remote location such as onto a disk. The term paging is often utilized because it is a flushing technique where the virtual address space is divided into fixed-sized blocks called pages and pages are flushed. A "page" is generally a contiguous block of memory of a certain size where a system manages units or blocks of memory the size of a page. Traditionally, pages in a system have uniform size or segment, for example, 4096 bytes. A page is generally the smallest segment or unit of translation available to an OS. Accordingly, a page is a definition for a standardized segment of data that can be moved and processed by the system.

As part of virtualizing memory, traditional OSs perform memory pinning or pinning of memory pages. Pinning of pages or reserving of memory pages is typically a privileged capability. Pinning is typically not available to normal processes but only to hypervisors and kernel extensions of the OS. A kernel extension can be a pair of an OS that coordinates sharing of resources, where a kernel can "take" resources from the OS.

It can be appreciated that to make multiple OSs on the same platform operate efficiently, proper memory management can be a concern. On a computing platform that runs multiple OSs and/or processes, a majority of OSs and/or processors may stay idle, only utilizing a small percentage of their resources, while a few OSs or processors run at or over capacity. An OS that is overcommitted or running over capacity can be slowed by the lack of resources and can even fail. It can be appreciated that memory allocation is an important feature and lack of memory resources can significantly affect a platform and an OS.

For example, when an OS runs out of real or high performance memory assets (i.e. random access memory (RAM)), the OS will often resort to mass data storage assets, (a disk drive) that compared to RAM are slow, inefficient memory resources. If the memory required by the OS or application exceeds what is allocated in RAM (for example, due to unpredicted high peak demand), and the system cannot locate and utilize a disk drive, the OS can run out of memory and the system can lock up or "crash."

To avoid memory shortcomings, some computing platforms provide virtual memory to OSs. Generally, a virtual memory can be memory that is allocated which may not have a "physical" basis at any time, but can be mimicked as physical memory in conceptual terms. Alternately described, virtual memory can be a subsystem which is simulated by the computing platform. Thus, virtual memory can describe an amount of memory that is larger than the actual memory. However, a properly operated virtual memory system can provide more cost effective storage than a memory system with fixed memory allocations.

Many virtual memory systems are controlled by a hypervisor or a virtual memory manager (VMM). A hypervisor is often referred to as a virtual machine monitor/controller, where a hypervisor can manage a system such that multiple OSs can share resources according to a set of rules. Typical virtual memory designs overcommit memory.

OSs that run in a virtualized memory environment may not be aware of memory virtualization. Some traditional systems provide memory virtualization by using an "off-the-shelf" operating system an(1 adding a cooperative memory overcommitment (CMO) kernel extension to the OS. This kernel extension can assist a hypervisor in managing the virtualized OSs memory resources. By limiting the amount of memory that can be pinned, the system is left with a large enough pageable pool to manage future allocations.

Global collaboration is becoming increasingly important in today's society. More and more applications are being designed to allow application data to be shared by multiple users across the globe or within the given network. Currently, methods exist that allow for this data sharing but with drawbacks. For instance, consider two users needing to modify a common file. This file can be shared on a network by both users, but with a price. Users currently have to setup a network file system (NFS) to host the file, then in order to access the data, information will have to be transmitted across the network. If security is an issue, a secure system must be provided. In order to share one file, users must now utilize multiple technologies in order to get access to the file.

Many existing distributed computing solutions implement a master-slave architecture where there exists a master node which sends workloads to the slave nodes. The master node can collect the results from each slave node as a given task is completed. In order for this communication to take place, the master node must serialize the data objects or pass the data in a primitive form to be parsed/deserialized by the slave nodes. This process is time consuming since it requires significant overhead to parse the data.

BRIEF SUMMARY OF THE DISCLOSURE

A method for distributed computing utilizing virtual memory is disclosed. The, method can include identifying a first node to process an application, identifying paging space accessible to the first node, identifying a second node to share paged data with the first node, and transacting the paged data between the first node and the identified paging space. Thus, application processing results from the first node can be stored in paging space and a second node can retrieve the first result from the paging space such that the paging space can be shared between nodes. Other embodiments are also disclosed.

BRIEF DESCRIPTION OF THE SEVERAL VIEWS OF THE DRAWING

Aspects of the disclosure will become apparent upon reading the following detailed description and upon reference to the accompanying drawings where like references may indicate similar elements.

DETAILED DESCRIPTION OF EMBODIMENTS OF THE DISCLOSURE

Figure 1:
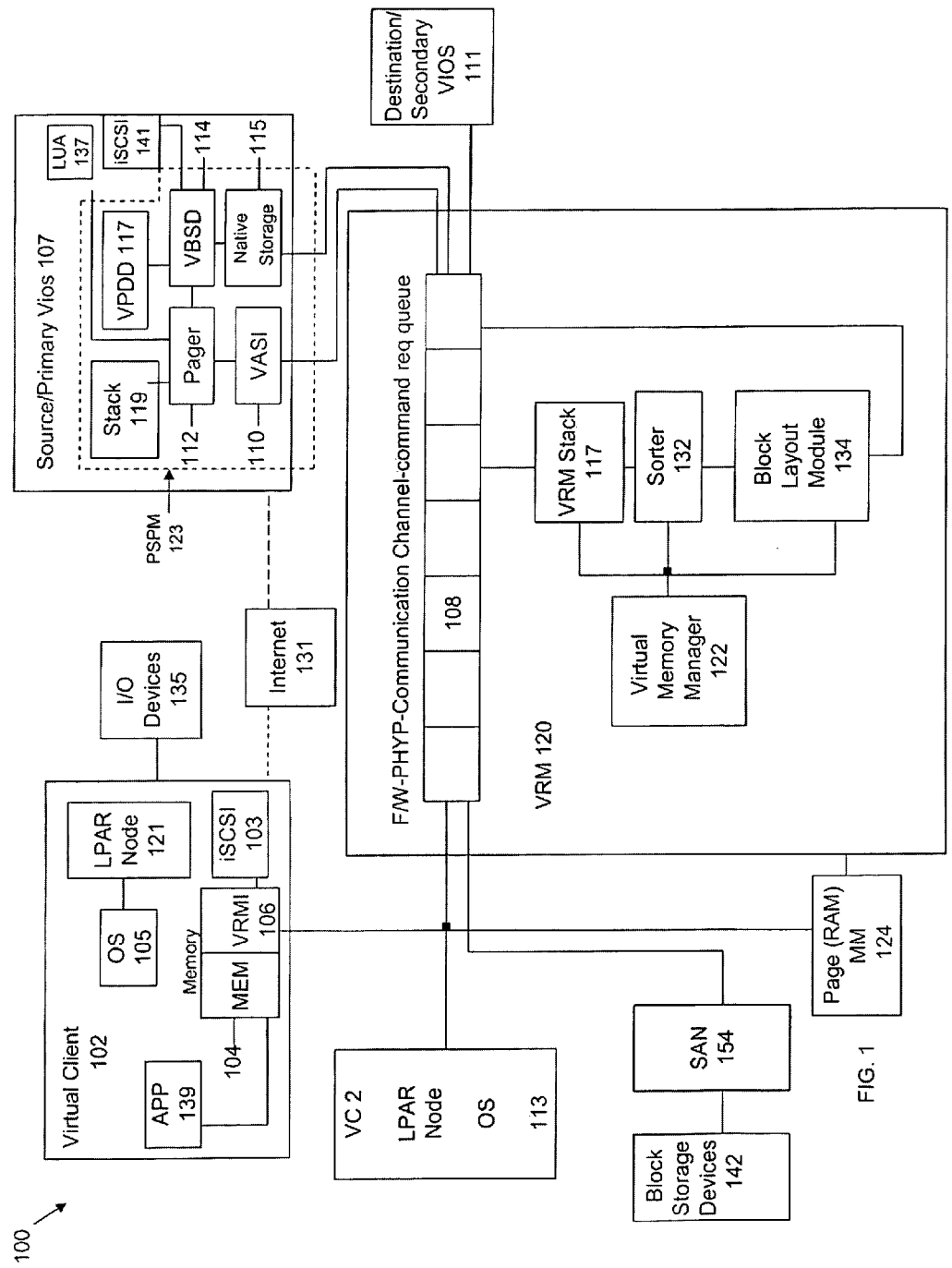
FIG. 1 is a block diagram of part of a computing platform with virtual real memory.

The following is a detailed description of novel embodiments depicted in the accompanying drawings. The embodiments are in such detail as to clearly communicate the subject matter. However, the amount of detail offered is not intended to limit anticipated variations of the described embodiments; but on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art. While specific embodiments will be described below with reference to adapters, components, circuits or logic configurations, those of skill in the art will realize that embodiments of the present disclosure may advantageously be implemented with other components and configurations.

There has been a recent increase in the demand for virtualization of computing platforms. This has occurred because businesses, such as those that run datacenters supporting Internet processes and data service businesses serving other businesses, cannot keep up with the processing demands of new clients and new applications. Virtualization of a server is much more efficient than adding new computing platforms, or in some cases additional servers. It can be appreciated that datacenters are typically overstretched in terms of server count, floor space, electricity consumed, and heat generated per square foot of raised floor space.

Virtualization of a computing platform can reduce server count by increasing the utilization efficiency of the computing platform and lowering the operating cost of such platforms. Virtualization is also an excellent solution to the problem of overwhelming demand for processing resources. Virtualization technologies can include the functions of a hypervisor, hardware partitioning, logical partitioning, and in accordance with the arrangements herein, virtualized memory management.

Generally, virtualization enables the sharing of the computing platforms physical resources. Virtualization is a multifaceted process that can be implemented through a combination of hardware, firmware, and software arrangements. In its simplest form, a hypervisor or virtualization engine is a layered architecture composed of a firmware module. A virtualizer can "sit" on top of physical hardware resources and control the hardware to provide administration and resource management of the hardware. Thus, virtualization can control many functions such as partitioning OS access to a pool of resources. With such extensive virtualization, hypervisors have become complex and bear a heavy work load. Distributing the hypervisors workload would be a desirable feature.

When multiple OSs are operating on a computing platform, there can be a host OS and a plurality of guest OSs. Each OS can have a kernel or kernel extension that can coordinate the sharing of resources with the hypervisor. Each guest OS's kernel and its drivers typically need to be modified to operate with other OSs. For example, a desktop running both a virtualized Windows XP® and a virtualized Max OSX® operating system will typically have one kernel extension for each operating system instance where the kernels must be configured for the particular application and hardware. In addition, a typical kernel extension takes memory from each OS. The kernel memory allocations from the OS's memory pool can be allocated and reallocated as each virtualized OS's needs change.

Although many embodiments below discuss paging, page space, blocks etc., the disclosed embodiments are not limited to any particular dimension such as a logical volume defined by a page. The term page and page space as utilized herein is intended to mean any fixed size logical dimension or logical volume of data that data can be divided into. Hence, the term page is utilized synonymously with block herein.

Thus, the disclosed platform/system can transact in pages and blocks where pages or blocks of data can be moved between hardware devices. For example, block memory transactions can move blocks of data between a virtual memory and processing nodes. A page or a block as utilized herein is generally a contiguous block of memory addresses of a certain size where a system manages blocks or pages of memory in such dimensions. The page or block disclosed herein is generally the smallest segment, unit or dimension of translation or transaction available to an OS. Accordingly, a page or block as utilized herein is a standardized segment or dimension of data that can be efficiently moved and processed by the hardware and software of the disclosed system in response to an information storage or retrieval request.

A virtualized memory can store and retrieve blocks of data. The description hereinafter refers to a block as the smallest memory segment that is processed. However, the arrangements disclosed could operate on any metric, such as pages, and such terms should be treated synonymously. The exact size of memory segments that are managed by a computing platform is typically determined by the system and what granularity the hardware can translate from an effective to a physical address. A logical volume, block or page of data cannot be defined in terms of an exact dimension because, for example, page spacing can change the dimension (number of bits or bytes stored) stored as a page or a block.

For example, logical volume page spacing can change the dimension the pages. Logical volume paging space is defined by making a new paging space logical volume or by increasing the size of existing paging space logical volumes. Logical volume management is a method of allocating space on mass storage devices that is more flexible than conventional partitioning schemes. In particular, a logical volume manager can concatenate, stripe together or otherwise combine partitions into larger virtual storage blocks that can be resized or moved, possibly while in used. Logical volume management is one of many forms of storage virtualization. Storage virtualization can be implemented as a layer in the OS disk driver stack. The description herein often refers to data transaction in blocks or pages of data. Such logical volumes should be considered as synonymous as any dimension of data could be processed by the disclosed embodiments. Accordingly, any paging device disclosed here could process blocks or pages.

Disclosed herein are arrangements for performing data manipulations on blocks of data. Some embodiments include manipulating data for virtual real memory data and a technology that allows for direct memory access to multiple nodes such that processing nodes can access a shared virtual memory region within a grid environment. Each node in a grid can be a logical partition forming a data grid or a computational grid. All the nodes in a grid could access the same paging device or all nodes could access different devices, but a backing device could provide at least one common paging device for data transfer among nodes.

The disclosed embodiments utilize a virtual input output server (VIOS). A VIOS allows sharing of physical resources between logical partitions (LPAR). An LPAR is generally a subset of a computer's hardware resources, where the subset is virtualized and an LPAR can operate as a separate computing device. In effect, a physical machine can be partitioned into multiple LPARs, each housing a separate operating system. A VIOS can operate as a partitioned hardware adapter and can service end devices or logical devices such as Internet small computer system interface (iSCSI) adapter, compatible disks, Fibre-Channel disks, Ethernet drives, compact disks (CD), digital video disks (DVD), and optical drives or devices. Some embodiments here disclose utilizing a VIOS to operate block I/O devices, particularly block storage devices.

Referring to FIG. 1, a diagram illustrating a computing system or platform 100 with a virtual real memory (VRM) 120 is disclosed. The platform 100 can include multiple virtual clients such as virtual client 102. Virtual client 102 can have an operating system (OS) 105 that is, running on a logical partition (LPAR). The partitioned virtual client 102 can be referred to as an LPAR node (121) or processing node. In distributed processing applications, multiple nodes can share a workload to efficiently dispose of a process.

Virtual client 102 can include memory 104 and a virtual real memory interface 106 (VRM). Virtual client 102 can process a task defined by application 139. Application 139 can reside in VRM 120 and can be provided to virtual client 102 for processing. More specifically, application 139 can be loaded in part or in full into memory 104. The virtual client 102 can be described as an OS that can run multiple applications. The virtual client 102 can provide input and output (I/O) to a user via I/O devices 135. I/O devices 135 could include keyboards, pointing devices and a display, to name a few.

Generally, VIOSs 107 and 111 allow LPAR based entities such as virtual clients 102 and 113 to access end devices such as VRM 120 and block storage device 142. VIOSs 107 and 111 also allow logical devices to be shared by virtualized hardware resources. An LPAR resource that controls a VIOS's or VIOS resource(s) can be called the VIO Server (VIOS) and other LPARs that utilize the VIOSs services such as LPAR 121 having virtual clients 102 and 113 can be called VIO clients.

Hypervisor 108 can be resident on the client 102 and hypervisor 108 can be resident of client 111. The hypervisors 108 and 129 can facilitate storing blocks of memory, such as pages on behalf of OSs 105 and 111 with minimal memory commands or instructions provided by the application 139. Each virtual client to VIOS communication channel can have a hypervisor such as hypervisor 108 and 129. Thus, hypervisor 108 is generally "low level" software specialized to control system hardware and offload specific tasks from the OS 105 and the application 139. The hypervisors 108 and 129 can be firmware code that is stored in the VRM 120, however since the hypervisor creates and controls the communication channel it is drawn as part of the communications channel.

The application 139 can delegate memory operations to the hypervisor 108 allowing the application 139 to continue processing while the hypervisor 108 and the VRM 120 handle memory operations. Hypervisor 108 can also perform paging which is the transferring of instructions, data, or both, between real storage or local memory and external page storage typically facilitated by mass storage devices as data is needed by an operating system or a processor. Thus, centralized virtual memory 120 operated by firmware 150 can increase efficiency, reduce costs and maximize resource utilization.

In some embodiments, VIOS 107 can partition the VRM 106 into logical volumes such as pages. In some embodiments, multiple VIOS partitions can be granted access to one or more logical units such as disk storage in block storage devices 142 by a storage area network (SAN) 154 administrator. The VIOS 107 in cooperation with PSPN 123 can assign a shared logical unit number (LUN) to paging devices providing services for a particular client or OS 102. The LUN can be utilized for addressing purposes. The paging space manager 123 can interact with virtual memory manager 122 to create such paging space and access to such paging space.

The VIOS 107, 111 can increase platform efficiency because instead of each LPAR or client 102, 113 having exclusive physical I/O adapters or interfaces for all end devices, (142, 120 etc.) VIOSs 107, 111 can perform as an adapter for multiple clients such as clients 102 and 113 (any many more). In some embodiments, VIOSs 107, 111 may not be specialized or function specific and thus are not limited on what interface functions they can perform, as VIOSs can be configured to perform a plurality of I/O interface functions and replace the need for function specific adapters. This all-in-one feature in an I/O interface can provide a tremendous savings to an end customer.

In one embodiment, VIOS 107 can perform as a small computer system interface (SCSI) adapter and a SCSI disk feature (the SCSI standard defines commands and protocols for transferring data between computers and peripheral devices). Both clients 102 and 113 can utilize the SCSI features to boot during start up. In addition, during operation the same VIOS 107 can provide the clients 102 and 113 access to VRM 120 and to block storage device and other peripherals. The multi-function multi-user VIOS 107 can significantly reduce costs because the VIOS 107 can eliminate numerous adapters, adapter slots, connectors, drivers, interfaces, disks, etc.

VIOS Set Up, Forwarding and 110 Redundancy Embodiment

In some embodiments, entities such as primary VIOS 107, a back-up VIOS 111 and paging device such as PSPM 123, VRM 120 can be assigned to an OS, such as OS 105. The term paging device includes any entity that transacts in logical volumes of data such as pages and blocks. For example, a paging device could be a stack 119 in a PSPM system 123 or could be a block I/O device such as a virtual memory (VRM 120) or a disk drive configured as a block storage device, 142. Thus, any hardware or software that transacts in logical volumes or block increment could be the identified paging device.

The assignment for an OS can be done during a boot process and the assignment can be dynamic or change during operation. For example, VIOS 107 and other paging devices or paging entities can be identified as useable by OS 105, and useable assignments could be displayed to a user via a display as part of I/O devices 135. In some embodiments, possible VIOS paging device to OS assignments can be displayed to and selected by user via user input, and in some embodiments, such an assignment can be done in an automated selection process, possibly by hypervisor 108. The possible assignments, user selectable assignments and automated assignments can be based on physical connections, proximity factors, capabilities, configurations, workload, etc. of the platform 100.

Thus, after an assignment is made, a device interface definition can be created for an OS or for each paging device. The device interface definition can include an OS, a primary VIOSs, a back up VIOSs, primary paging devices/entities, back up paging devices/entities, logical memory allocations in VRM 120 etc. The device interface definition can define preferred communication channels, forwarding instructions, and preferred back up channels that can be implemented when congestion or a failure occurs. Back-up VIOS or back tip paging devices can be given an order or a ranking such that in the event of a failure a first back-up will be activated and if the first back up is unavailable or has failed, the hypervisor 108 will try the second back-up and so on.

The device interface definition can define preferred communication channels and preferred back up channels that can be implemented when congestion or a failure occurs. The device interface definition can include a logical unit number (LUN) a logical address, a media access control address, a handle, an interface definition, a shared logical unit number, a label, state of the device information, etc. This information can be stored at one or more locations, such as at the VIOS. The information can be utilized by one or more OSs, firmware or hypervisor 108, a VIOS 107, 111, a PSPM 123, virtual memories, paging devices, block I/O devices, block storage devices, etc. to rout and re-rout communications.

A paging device could be stack 119 in a PSPM 123 or could be a block I/O device such as VRM 120 or a disk drive configured as a block storage device in block storage devices 142. Thus, any hardware or software that transacts in block increment could be the identified paging device. The block dimension or logical volume utilized by the platform 100 or VRM 120 can be defined by an "attribute type" defining page dimensions. This logical volume block dimension utilized to define paging space or swap space.

To control the communication channels, hypervisor 108 can programmatically send commands to VIOSs 107 and 111 based on OS operations and user input. To control the assignments in the device interface definition a kernel of the OS 107 can provide commands to the PSPM 123 in an extensible mark up language (XML) compatible data stream. The PSPM 123 which based on the device interface definition may forward the XML based commands to a second PSPM at a second VIOS 111 in a VIOS pair. The control signals in the XML data stream can have handles, labels or addresses that can be utilized by the PSPM 123 to move blocks of data. The label can be utilized to display paging devices that can service various OSs to an administrator. The device interface definition in the XML stream can be transparent to the PSPM 123.

When VIOSs 107 and 111 are paired as a primary VIOS and a back-up VIOS, the "state of device," a handle, and other device information of the device interface definition can be stored by the VIOS pair 107, 111 and can be available to the PSPM 123. During operation the handle can be sent to hypervisor 108 which can use handle to send read/write requests to and from paging devices. Hypervisor 108 may only send a write or read command and the hypervisor 108 may not need to detect information specific to devices. If a read or write request to a 107 VIOS fails, the hypervisor 108, using the back up information in the device interface definition, can send the same request to the second VIOS 111 in the pair to provide redundancy and robustness. Thus, a VIOS can be taken down for maintenance without significantly affecting platform performance.

Hypervisor 108 can have redundant access to pacing features of paging devices such as PSPM 123, stack 119, VRMI interface 106, VIOSs 107, 111, secondary memory storage, disk storage, permanent storage, or block storage devices 142 via the device interface definitions. Redundant access to the paging devices and redundant access to entities generally can provide additional stability and robustness for VRM 106 configurations. If forwarding is included in the device interface definition a primary VIOS can forward communications to another VIOS and redundant operations can occur.

The VRM 120, paging devices, and clients 102 and 113 can transact (store data to and retrieve data from) block storage devices 142. Block storage devices 142 can be a paging device, a hardware device, a mass storage device etc. Block storage devices 142 could include hard disks or any form of mass storage unit, typically having lower performance read-write times or longer access times than random access memory (RAM) that can implement memory module 124 and its pages. A block storage device as part of block storage devices 142 can include any mass storage unit or mass storage device that can store large amounts of information in a persisting and machine-readable fashion. Block storage devices 142 could be one or more hard disks, floppy disks, flash memories, optical disks, magneto-optical, discs magnetic, tape drums, or holistic memories. Such block storage devices 142 could have removable and non-removable media.

Above, some components of one virtual client 102 have been described generally. The platform 100 could support many more virtual clients such as virtual client 113 (VC 2). It is not uncommon for a large platform to support a plurality of virtual clients. Likewise, only one OS 105, application 139, and LPAR node 121 have been mentioned, yet an OS could operate and a platform could interconnect many of such entities. Only one or two entities are shown in the figures and only the functions of one or two entities are typically described herein, however, the platform can have any number of entities. Like entities, such as virtual client 102 and virtual client 113, can have similar, identical or different operations, however, only one entity is typically described herein to simplify the description. Thus, for example, the functions and operations described of client 102 and OS 105 can and often apply to OS, LPAR node, virtual client 113.

Some platforms may not have a VRM 120. To make the disclosed arrangements legacy compliant, an OS, such as OS 105, can detect the presence of a VRM 120. If OS 105 detects a VRM 120, the OS can change its mode of operation to utilize the disclosed features. When no VRM 120 is detected, the OS can operate in accordance with legacy systems.

In operation, virtual client 102 or just client 102 can utilize VRM 120 as its "personal" random access memory (RAM). VRM 120 can allocate a logical amount of memory to each OS. The VRM 120 can manage the virtual memory with the assistance of firmware (F/W) or hypervisor (PHYP) 108. Generally, when the VRM 120 needs physical memory, the virtual memory manager (VMM) 122 can send blocks of memory to block storage devices 142. This process can be referred to as paging.

In some embodiments, the firmware 150 can be assigned to interact with a primary VIOS 107 and if the hypervisor 150 detects an error, such as a disruption of communications with the primary VIOS 107, the firmware 150 can send the same commands and input-output (I/O) to a secondary VIOS 111. Such a solution can provide redundancy for VIOSs such as VIOS 107, 111 or for software that controls the VIOS, as well as redundant hardware for paging devices to utilize without requiring or having complex firmware code. This redundancy allows for hardware outages and software maintenance on the VIOS 107, 111 without interruption of service to a client 102 and/or clients. This solution also minimizes the complexity of the hypervisor 150 ensuring platform robustness and stability.

VRM 120 Operating Embodiments

In some embodiments VRM 120 can be considered as a paging device or a memory that transacts in blocks. VRM 120 can map blocks or pages to logical locations into a table that tracks all or most all physical address available on the platform 100. This mapping process allows data to occupy less physical memory or local memory than is allocated as logical address space. Components of VRM 120, such as memory module 126, VRM stack 117 etc. can have binary storage that is logically divided into pages.

VRM 120 can send blocks or pages (page out) unused or infrequently used pages, blocks, or logical dimensions of data to a swap area on block storage devices 142 to make room for high performance memory needs and these pages can be "paged" back in to RAM in memory module 124 when needed. Such a swapping process allows a program or application operating on the OS 105 to be "allocated" more memory than is actually available in memory module hence VRM 120 can function as a virtual memory.

Virtual memory manager 122 can index pages, blocks, frames, logical volumes, etc., and provide a logical address to physical memory location conversion table. VRM 120 can transact in logical volumes/dimensions, blocks, pages etc., and can be memory that operates utilizing logical dimensions or volumes such as a page or block of memory. The virtualized memory system VRM 120 can have one or more page table(s) that can be utilized to translate effective address or virtual address to a real address. The OS 105 or hypervisor 108 can manage the table to reflect how the OS 105 has allocated memory resources. The table can include tracking functions to track what physical locations are "in use." Such tracking can include tracking of memory locations that are being used by the kernel, applications, OSs etc. and what physical locations are pinned, in use, idle, storing open files, etc.

When virtual memory blocks or pages that are allocated to the OS are needed by the hypervisor 108 or OSs 102, 113, the virtual memory manager 122 can physically move blocks (i.e. logical volumes) of memory out of memory module 124 to block storage devices 142. In some embodiments, physically moving pages of memory, allocated for an OS, out of memory module 124 to block storage devices 142, does not change the logical volume or dimension of memory allocated to the OSs. Logical volumes or pages can be physically moved to block storage devices 142 to make room in physical memory in memory module 124 for needs by other OSs, hypervisor, kernel extensions etc. when needed. Such a logical volumes of physical memory allocated for an OS hypervisor etc. in memory module 124 RAM that are moved to block storage devices can be place "on loan" to these other entities. In some embodiments, hypervisor 108 can create and control the logical to physical address mapping and perform the paging or in some cases page swapping.

In accordance with the present disclosure, VRM 120 can transact with entities in the platform 100 by receiving, storing, retrieving and transmitting blocks of data based on control commands from the OS(s) 105 and 113, the hypervisor 108 and from the paging space partition module (PSPM) 123.

(Generally, the PSPM 123 can be a block compatible device or paging device that enables bridging between physical input-output devices to virtual input-output devices).

It can be appreciated that some logical volumes or pages resident in VRM 120 may rarely be accessed. When the amount of free random access memory (RAM) in memory module 124 is low, the logical volume, pages, entire programs or data that have not been recently utilized can be moved from memory module 124 to paging space in block storage devices 142 to free up high performance RAM for current or other more important activities.

The VRM 120 can provide fast, efficient high performance memory for client(s) 102 and 113. VRM 120 can also "page memory" a process of sending blocks of memory to block storage devices 142 when page (RAM) memory module (MM) 124 runs low on physical memory capacity. The control commands that control the VRM 120 can be generated by firmware 108.

Thus, generally clients, represented by clients 102 and 113, can transact with other entities of the platform 100 utilizing firmware or a hypervisor 108 to control the VIOS 107. Although VRM 120 prefers to transact in blocks of data (receive, store, retrieve and transmit), clients 102 and 113 may or may not transact in blocks of data. In some embodiments, client(s) 102 can transact with other memory or storage devices represented by block storage devices 142. Block storage devices can be physical devices, physical volumes (PVs), hard disks, compact disks, read only memory drives or memory regions, hard disk partitions, redundant array of inexpensive drives (RAID), storage area networks (SAN) 154, etc.

The term data and information are used synonymously and interchangeably herein. Data and information, as the terms are utilized herein, include instructions, commands, application data, application context data, raw data, processed data, etc. wherein the word data, as utilized herein, includes any binary sequences. Paging devices, block devices of block I/O devices, such as block storage devices 142, can include any device which the platform 100 utilizes to move data in discrete dimensions, such as pages or blocks. When a block device operates as a node or a logical unit, it can be assigned an address, a physical address, a logical address or a logical unit number. A block I/O device can often support random access and seeking, and generally use block buffered inputs and outputs.

In the communication path, the OS(s) 105, pager 112, stack 117 layout module etc., can have block sized data buffers to hold a single block of data. In fact, each input and output of communicating entities can utilize a block sized data buffer to facilitate transactions in blocks. For example, when application 139 and OS 105 send a request to read data from or write data to block storage devices 142, components in the data custody chain can store bits of the transmission in a block sized buffer. When the buffer fills tip, a block data transfer can occur, clearing the buffer for the next incoming block of data. Pages are often referred to as blocks and vice-versa and such terms are used synonymously herein.

Page Spacing Partition Module Embodiment

In some embodiments, logical volumes of data such as blocks can flow on a path between client(s) 102, 113 and the VRM 120, via Primary VIOS 107 and the communication channel facilitated by the hypervisor 108. The VIOS 107 can include a paging space partition module (PSPM) 123 (described above) as contained within the dashed box.

To achieve such a bridging function, the PSPM 123 can include a virtual asynchronous services interface (VASI) 110, a pager 112 or page driver, a virtual block storage device interface (VBSD) 114, a stack 119, possibly a hypervisor (not shown within) and a virtual paging device driver (VPDD) 117. It can also include a Logical Unit Assignment module (LUA) 137, an iSCSI module 141 (generally, the SCSI adapter 141 can conform to a well developed standard of commands and protocols for transferring data between computers and peripheral devices), and a Native Storage module 115. The PSPM 123 can facilitate the transfer of data blocks from nodes or clients such as client 102 to block I/O devices (possibly virtual devices) such as VRM 120 and/or block storage devices 142.

Pager 112 can perform as a block sized buffer to ensure paging space for data transfers by placing incoming and outgoing data into blocks or pages. Alternately stated, pager 112 can create blocks of data by buffering serial data such that the data can be moved in block increments. The pager 112 can have a buffer page that accepts data serially and when the buffer page is full, the pager 112 can dump or transmit the page of information to the VBSD 114 or the VASI 110. Pager 112 can receive a page-in and page-out or a block-in block-out request from the VASI 110. Responsive to the request, the pager 112 can receive a page from or send a page to the VBSD 114. Likewise responsive to a request from the VASI 110, the pager 112 can receive a page from or send a page to the VASI 110.

In some embodiments, the functions of the PSPM 123 can be shared between VIOS 107 and VIOS 111. Such a configuration can provide redundancy. For example if a failure would occur, the PSPM 123 could provide VIOS 111 with virtual I/O services. The native storage module 115 can be utilized to store information that is dedicated to the VIOS 107.

Multi-Function VBSD Interface Embodiment

Traditional OSs have kernel extensions (control codes) that are sent to block I/O devices to control the operation of, or manage the block input/output (I/O) devices. Such block I/O devices can include paging devices such as VIOS 107, VIOS 111, block storage devices 142, VRM 120 and even PSPM 123. Thus, transmissions sent from OS 105 to an I/O device have to include logic in the kernel extension to control the block I/O device. Such kernel logic can perform an interaction with or interrogation of the block I/O device to gather information about the device and to configure the device a specific way, such that the device will operate properly when supplied with the desired data. It can be appreciated that the control set up for a block I/O device such as storage devices 142 and VRM 120 requires a significant amount of code and interaction between the OS 102 and the I/O device such as VRM 120 over the communication channel. In addition, significantly more kernel logic and code is needed for virtual block storage devices such as VRM 120, stack 117 and block storage devices 142 than for traditional 110 devices.

In some embodiments, the kernel extension that traditionally resides on the OS 105 or in the hypervisor 108 can be placed in, or moved to the VBSD interface 114 to simplify the control features of the OS 102 and the hypervisor 108 and most importantly, simplify system operation of the disclosed.

Accordingly, physical I/O devices, such as I/O devices 135 controlled by OS 102 can be bridged to the virtual I/O block processing VRM 120 via the VBSD interface 114. The block processing transaction interface (i.e. the VBSD interface 114) can accept control or management commands from the OS 105 and can perform data transactions with block devices such as the VRM 120 and/or the block storage devices 142. In some embodiments VBSD interface 114 can perform as in interface between OS 105 and VRM 120. The VBSD interface 114 can accept a kernel extension or command and utilizing the kernel extension the VBSD interface 114 can manage communications with the VBSD interface 114 to facilitate data transactions between OS 105 and VRM 120.

In some embodiments a kernel extension driving the VBSD interface 114 could be provided by the VRM 120. In addition, Pager 112 may communicate with and control the VBSD interface 114 and pager 112 may change or modify paging requests and transactions between the VRM 120 and the VBSD interface 114.

In some embodiments the OS 105 can have an iSCSI initiator module 103 that can communicate via the Internet 131 to the iSCSI target module 141. The iSCSI target module 141 could communicate with the VBSD Interface 141. The OS 105 can detect the iSCSI target module 141 on the VIOS 107 as an iSCSI storage device and the OS may not be able to detect that it is in communications with the VIOS 107. Disk drives on the VIOS 107 (not shown) could utilize nearly any communication protocol such as serial attached SCSI (SAS), parallel SCSI, Fibre Channel etc. and the VBSD interface can communicate with the VIOS disk drives.

One benefit of such a flexible communication structure is that less expensive disks can be utilized to support VIOS 107 VIOS 107 (with iSCSI target module 141) can appear to other entities as an iSCSI storage device and any OSs that can initiate an iSCSI communication (i.e., have an iSCSI initiator adapter) can have access to storage devices (disks) on the VIOS 107 that the OSs determine are iSCSI compatible. Accordingly, data storage on VIOS 107 that has an iSCSI adapter can be seen by an OS and the OS will need no special modifications to implement such an embodiment.

The kernel extension can include logic needed to manage block I/O devices and more particularly block storage devices or paging devices such as VRM 120. By managing block communications, block I/O between the PSPM 123 and the VRM 120 the VBSD interface 114 can reduce the workload of the OS 105 and the hypervisor 108. It can be appreciated that moving control from the overworked OS 105 and the hypervisor 108 can reduce the complexity and reduce the development time for developing new block I/O devices and applications. For example, a new block I/O device can interface with the less complex VBSD interface 114 instead of developing an interface for a multitude of complex operating systems as has been the mode in the past.

In some embodiments, a single kernel extension can be resident on the VBSD 114 and the kernel can include complex logic for managing block I/O functions for devices such as VRM 120. It can be appreciated that a traditional kernel for managing block I/O can have 40,000-60,000 lines of code. Such code is utilized to interact with the block I/O device via the hypervisor 108 and then set up and control the block I/O. In accordance with the disclosed embodiment, the kernel extension provided by the OS 102 can activate the kernel of the VBSD interface 114 which can manage block I/O functions and services. Such management services, once activated, can be utilized by other VIOSs and other kernel extensions resident on other OSs. Such an extension can include a well defined interface between kernels of the OS 105s and the VBSD 114 kernel extension.

In some embodiments the control communications between the OS 102 and the VBSD interface 114 could be implemented by an AIX® type OS operating as the VIOS 107. In such an embodiment, the VIOS 107 can include an Internet small computer system interface (iSCSI) adapter 141. As stated above, the iSCSI adapter 141 can conform to a well developed standard of commands and protocols for transferring data between computers and peripheral devices. The iSCSI protocol allows clients (called initiators) to send iSCSI command descriptor blocks (CDBs) to iSCSI devices (targets). The block 110 devices such as VRM 120 or block storage devices 142 can be configured as a SCSI target device to facilitate the control and communication. The block storage devices 142 could be part of a storage area network (SAN) 154 or could be located on a remote server.

In traditional configurations, iSCSI kernel extensions have complex and extensive code and logic to manage and support both the iSCSI protocol and block 110 devices. In some disclosed embodiments, the code and logic to run the block I/O device can reside on the VBSD interface 114. Thus, the iSCSI kernel extension for the block I/O can be removed from the OS's iSCSI kernel extension, greatly reducing the iSCSI kernels complexity at the OS. Thus, the iSCSI kernel does not have to the up the OS processor and the communication channel between the OS 105 and the VIOS 107 with control signals and logic.

Accordingly, the traditional combination iSCSI-block I/O kernel provided by the OS 107 can be reduced in complexity by replacing the complex block I/O portion of the traditional iSCSI kernel configuration with simplified block 110 commands that can be utilized by the VBSD 114 to manage the block I/O functions. Thus, the complexity of controlling block I/O can be pushed out to the VIOS 107 reducing the workload of the OS 105 and the hypervisor 108. In some embodiments, the kernel extension residing on the VBSD 114 could emulate an iSCSI target device such that the kernel of the OS 105 and/or hypervisor 108 will utilize a proven interface and operate successfully without significant modification. Thus, during operation, the OS 102 and the kernel may not detect that they are transacting with a block I/O device.

As stated above, placing the block 110 control in the VBSD 114 eliminates the need for the block I/O kernel extensions in the iSCSI kernel extension of the OS 105. The iSCSI kernel extension can provide the iSCSI protocol and logic with a simplified control signal for the VBSD interface 114. Implementing a VBSD Interface 114 and splitting the control function can reduce the time to market for block I/O type iSCSI products because a manufacturer can forego creating and testing 40 k-60 k lines of complex logic which now can reside in the VBSD interface 114

Distributed Computing and Data Sharing Embodiment

In some embodiments, the VRM 120, and the PSPM 123 can provide services to copy results from multiple processing nodes to the root processing node or the requesting node. An implementation of sharing results of such a distributed or grid processing feature can have multiple embodiments. In some embodiments, both a source VIOS 107 and a destination VIOS 111 can have access to the PSPM 123. In other embodiments, the destination VIOS 111 may not have direct access to the source VIOS 107 or source paging device and the hypervisor 108 can set up an intermediate node that can bridge block data transactions between the source VIOS 107 and the destination VIOS 111.

In such an embodiment, the intermediate node can be a node that is common to the source VIOS 107 and the destination VIOS 111 in the grid where the destination VIOS 111 can access a PSPM such as PSPM 123 or a source paging device, so the destination VIOS 111 can indirectly access the source node VIOS.

In some embodiments, data and/or the results from a computation performed by a node or client can be passed from node to node or client 102 to client 113 using services provided by the PSPM 123. Such a configuration allows for clients 102 and 113 to share data (data and applications) and to share VRM 120. In some memory sharing embodiments the PSPM 123 can also have a stack 119 or operate with the stack 119 when sharing data and application between clients or nodes. The stack 119 can be compatible with uniform VRM data blocks and can be referred to as a VRM stack. The stack 119 could be stored in native storage 115 or any other entity such as the VBSD 114, or VPDD 117.

VRM 120 can be configured such that it appears to OS 105 that "all" memory on the platform 100 is central virtual memory and block storage devices 142 and memory module 124 can physically provide the memory resource. Thus, the VIOS 107 and the VRM 120 can be referred to as a stack-based system because the VIOS 107 and the VRM can temporarily store information in stacks as opposed to register type systems. Data blocks held in the stack 119 can be quickly and securely send from node to node or OS to OS. The disclosed data transfer configuration is superior to traditional distributed computing configurations that utilize a master-slave configuration where users have to setup a network file system (NFS) to host the file, then users exchange sensitive information across a public network often utilizing an expensive virtual private network. Further a master node must serializes data objects or pass the data in a primitive form to be parsed/de-serialized by the slave nodes then collect the results from each slave as they complete a given task.

This technology requires significant overhead, is not secure, slow and requires multiple technologies/systems. The disclosed node-to-node block stack exchange is secure and the master and slaves can communicate without parsing/de-serializing and instead can read the data in its native binary form. The PSPM 123 can perform functions that further improve block transaction efficiency. In some embodiments, the VIOS (107, 111) via the PSPM 123 can reduce the workload, responsibility and control of the hypervisor 108 and offload the hypervisor 108.

For example, in a data or application sharing environment, the PSPM 123 can identify block devices or paging devices such as VRM 120 or block storage devices 142 that can interface with the hypervisor 108. The PSPM 123 can then select another PSPM (not shown) and the two PSPMs can configure access to one or more block storage devices such as devices 120, 142. The PSPMs can then conduct simple interface communications with the hypervisor 108 to support the input-out (I/O) of the block storage devices 120, 142.

In a distributed processing configuration or a data sharing configuration the PSPM 123 can take some control functions from the hypervisor 108 and control the VRM type stack 119, the VPDD 117, the pager 112, the VASI driver 110, the VBSD 114, Native storage 115 and the hypervisor 108, and can control the flow of the application data, raw data, results back, etc. between various nodes in a grid.

As mentioned above, VRM 120 can be utilized to share data and instruction from applications among multiple clients and entities such as clients 102 and 113. Traditional data sharing systems have significant security issues so data needs to be encrypted when the data is transferred serially over a public network. Typically, encryption and network latency will seriously impact system performance. More specifically, securely moving data from node to node in traditional systems requires numerous processes and sometimes expensive hardware.

Storing and moving application data via the PSPM 123 and the VRM 120 bypasses the need to transfer the data across the public network and provides increased security while eliminating expensive hardware and software utilized by traditional systems. In addition to allowing data and application data to be shared, the disclosed arrangements allow application context data to be shared by entities such as clients 105 and 113. The VRM 120 and PSPM 123 operating in block data transfers utilizing stacks provides an efficient conduit for moving data to and from processing nodes.

The VRM 120 and PSPM 123 of the platform 100 allows application data to be stored in sharable, reusable, mobile data blocks, often in stacks such as stacks 117 and 119, and in VRM 120 assets such as memory module 124 and block storage devices 142. It can be appreciated that the data blocks with application related content can be quickly and freely transferred by the PSPM 123 to and from block devices including VRM 120 and clients 102 and 113.

The logical volume, logical dimension, page or block transfer arrangements disclosed herein have built in robustness and security features. For example, the functions of the hypervisor 108 and block based transmissions makes it much more difficult to eavesdrop on platform communications. Further, the hypervisor 108 provides security features and manages the VRM 120 in a secure manner. In addition, when data is stored in the VRM 120, and a node processing a portion of an application goes down, the application data should still be present in the VRM 120. The platform can be configured with two systems/nodes or clients 102 and 113 where each client 102 and 113 has access to the VRM 120. Thus, a client 102 or user can recover data, if for some reason the other client 113 was not able to persist changes or store results before the client 113 failed.

The detection of virtual memory on the platform or server allows OS 105 to treat VRM 120 or community memory as virtual memory. OS 105 can detect VRM 120 then it can enable firmware or hypervisor 108 such that OS 105 can communicate with VRM 120 via the VIOS 107. The enabled hypervisor can manage the read and write transactions for the OS 105 in coordination with the paging space partition module (PSPM) 123, thereby offloading resources of OS 105.

Accordingly, using VRM 120 and its associated communication services, application context data, application data, raw data and processed data can be exchanged between clients 102, 113 and VRM 120. It can be appreciated that the VRM 120 can support nearly any type of block storage device or block 110 device and a considerable number of OSs or processing systems can be configured such that they have access to the VRM 120 or a shared memory region in the PSPM 123. Any one of the supported OSs can open an application 139 and can utilize the application in real time with many other OSs. This distributed computing embodiment is discussed in more detail in reference to FIGS. 2 and 3.

Storing & Retrieving Blocks of Data Having Different Dimensions

As stated above, the platform 100 can communicate data among its components or entities utilizing data segmenting or concatenating data into a standard or uniform dimension referred to as blocks or pages. Generally, OSs that do not process data that is block aligned cannot use the VRM 120. When transmissions in the platform 100 are non-uniform the data can be accompanied by an attribute. An attribute or attribute type in a transmission can define the size, type or dimension of the logical volume, such as a page that is moving in the system. Markup languages, such as hypertext mark up language (HTML) and extensible mark up language (XML) use attributes to describe data and the formatting of data.

As described above, the platform 100 and particularly the block devices such as the VRM 120 and block storage devices 142 can efficiently move and store data. This is true as long as the blocks of data comply with a standard dimension that the platform is designed to accommodate. Non-standard data segments moving in the platform 100 can significantly reduce the efficiency of the platform 100 for many reasons. Processing non-standard segments, or data segments that are larger or smaller than the optimum block size for which the platform is designed, can also require a significant overhead.

It can be appreciated that a non-standard data segment with a dimension that is larger that the standard dimension must be parsed by data handling entities as the non-standard data segment is moved about the platform 100. Likewise, when a data segment is moved that has a dimension that is smaller than the standard dimension data handling entities must "fill" unused bits to convert the smaller segment into a uniform segment.

Further, when storing non uniform segments into block devices with uniform dimensions at least a final parsed segment may remain. This final segment may only fill a small portion of a block or page. Likewise, a non uniform data segment having a smaller dimension than a standard block can result in partially filled blocks or require a storage device to fill unused bit location in the block. Such a fill requirement/process can significantly reduce the efficiency of the memory system because the memory manager is only storing or retrieving a portion or percentage of the total capacity of the system.

In some embodiments, data moving entities in the platform 100 can sort non-uniform data segments (or segments that do not fill an entire block) by destination address and can paste segments having the same destination into a block. Sometimes a block could include data from two or more unrelated non-uniform segments.

The VRM 120, and possibly other data moving entities such as the pager 112, can have sorters such as sorter 132 and buffers or layout modules such as block layout module 134. The sorter 132 can monitor attributes, a destination address, such as a logical address or a logical unit number (LUN) contained in incoming data segments. Based on the monitoring the sorter 132 can identify data intended for block storage devices or block I/O devices. After sorting, the block layout module 134 can coalesce or concatenate non-uniform data segments or layout the segments on a block or page. In some embodiments, the layout module 134 can "paste" or load multiple non-uniform (possibly unrelated) data segments onto a single block or page such that the block of memory can be better utilized. Providing such a block layout by coalescing can unite non-standard data segments or data crumbs into standard block dimensions to increase system efficiency.

A native I/O storage device driver stacks, such as VRMI 106, can fail during I/O requests if the data is in non-standard dimension or the transfer length of the data is not aligned with the block size required by the VRMI 106 (i.e. the data segments are non-uniform). OS 105 may use VRM 120 or other block I/O devices but may not be able to determine that VRM 120 or the block I/O device has dependencies on block based transmissions. Some OSs that utilize VRM 120 may process and transmit data segments that are non-uniform or are not aligned with the block size of the block storage device. Thus, the VRM 120 can provide an arrangement to accept data segments that are non-standard or not block aligned, and make the data block aligned by sorting and coalesce data for transfer and storage. Thus, the disclosed VRM 102 allows a legacy OS that does not transact using block aligned data to interface with the VRM 102.

It can be appreciated that VRM 120 enables data transfers from virtual client 102 to block storage devices 142 via an I/O request sent from the client 102 to the VBSD 114. These I/O requests may describe multiple data transfers to different memory locations such as memory module 124, storage devices and SAN 154. In some embodiments, each data transfer coming into the VRM 120 can be examined and sorted by sorter 132 according to the logical block address of the block storage device for which the block is intended. The sorted data transfers can be stored in a data structure that will facilitate easy grouping and coalescing of non-block aligned data into block aligned data for a block transfer.

Once requests are sorted and coalesced, the data can be sent down to the native (i.e., being independent of neighbors or other operating systems) I/O device driver stack using a single command. Sorting and coalescing can significantly reduce the processing overhead and number of commands needed to process block data transfers thus improving performance VRM 120 and overall platform 100 performance. When the data is requested by the OS 102 and retrieved from block storage (142,124, etc.) the appropriate data can be transferred to memory controlled by the hypervisor 108 and specialized logic and local buffers can recreate the non-standard data segments. The hypervisor 108 can then transfer the restored data to virtual client 102 for use.

In some embodiments, the VRM 120 provides a centralized memory with a significant amount of memory that can be shared among OSs. It can be appreciated that generally, the more OSs on the platform with properly allocated virtual memory, the larger the loaner pool, and the better the memory utilization of the VRM 120 becomes. The OS 105 could be a host OS or a non-host OS. The storing and retrieving of pages or blocks of data having different dimensions can monitor changing logical volumes an reconfigure registers, memory partitions according to the size of data utilized by an OS.

Figure 2:
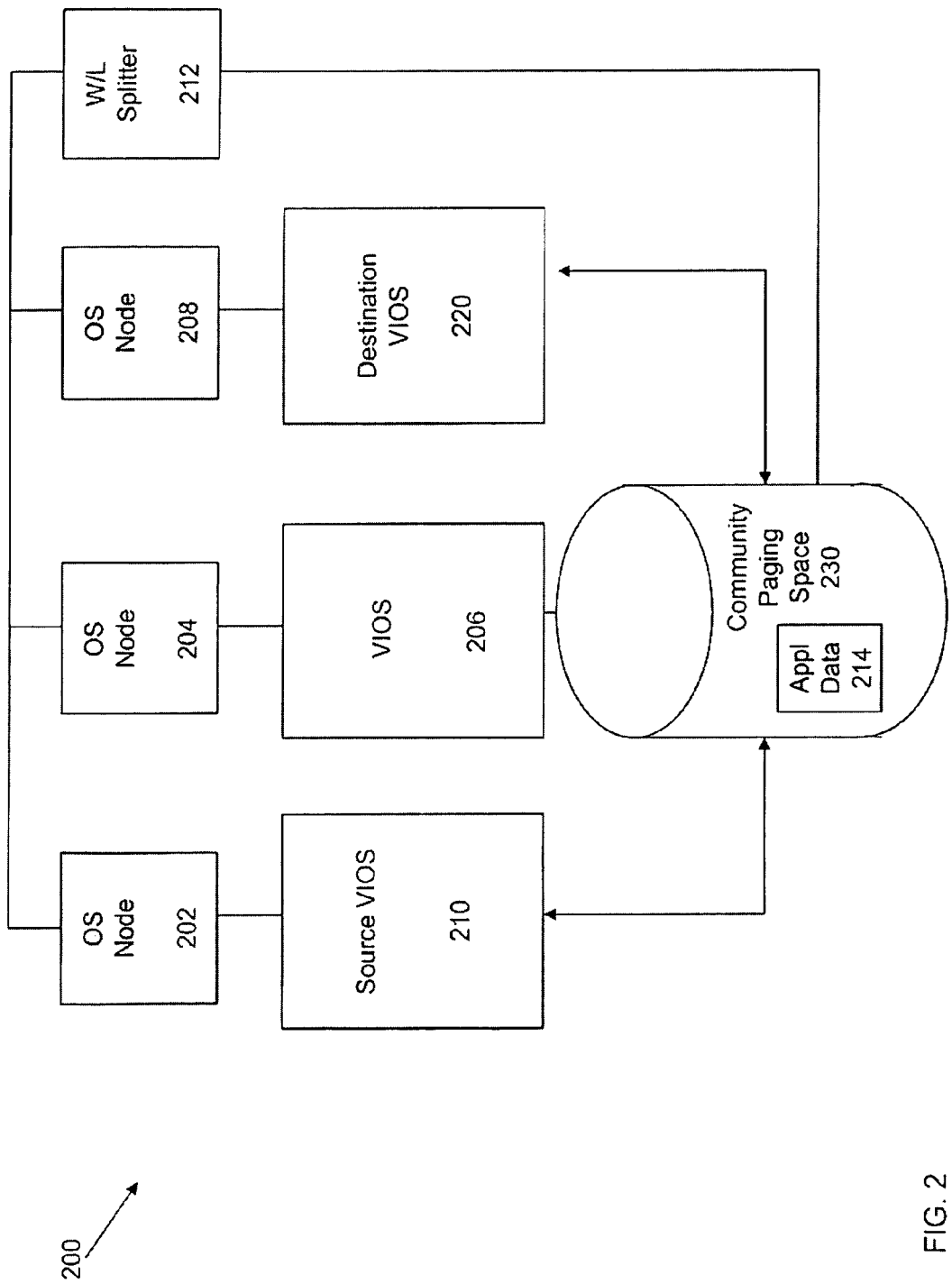
FIG. 2 is a block diagram of a distributed computing system that can share virtual memory.

Referring to FIG. 2, a block diagram is depicted of a distributed system 200 that allows processing nodes to share application data and application context data from a virtual memory system. The system can include three processing nodes or operating systems (OS) 202, 204, and 208 (i.e. 202-208), a workload (W/L) splitter 212, a source virtual input/output server (VIOS) 210, a destination VIOS 220, a third VIOS 206, and a community paging space 230. The community paging space 230 can store an application and data 214 that can be available to the community of processing nodes 202-208.

The community paging space 230 can be implemented by the paging space partition module (PSPM) 123 in FIG. 1. In addition, the paging space could be implemented by the virtual real memory stack 119 at various locations in the system 100 or 200. Although only three nodes are shown, the system could accommodate nearly any number of nodes. Although not shown, a hypervisor can facilitate transactions between the VIOSs 210, 206 and 220 and the community paging space 230.

The system 200 is significantly more efficient than traditional master-slave distributed processing technologies that serialize and encrypt data and require the master to set up a communication channel and communicate with each individual node to collect processed data from the slaves. System 200 supports a less complex, faster, more efficient, more secure direct memory access approach to distribute computing where there is no requirement for direct communication between processing nodes.

In operation, workload splitter 212 can parse or split the application 214 into tasks that can be processed by each node 202-208. The nodes 202-208 can each retrieve a task from the application 214, process the task and return results of the task to the community paging space 230, and retrieve another task utilizing page-in and page-out commands. After results are returned by a node, any of the nodes 202-208 can retrieve the returned results and use such results for another task and again return the results of the "another" task.

Accordingly, each node 202-208 can retrieve portions of the application based on the work load split provided by workload splitter 212 and each node can perform such operations (i.e. utilize current application data) as if the node was utilizing its own dedicated memory. Such a direct memory access on shared or community memory (i.e. virtual memory) allows nodes to spend more time processing the application than traditional distributed computing or grid computing because the nodes do not have to establish and reestablish a communication channel with a maser node. It can be appreciated that the communication channel between the community paging space 230 and the nodes is a secure, efficient channel that does not have to be established and re-established.

The centralized storage node (paging space 230) provides a hub for each node 202-208 to store and retrieve current data. It can be appreciated that the same channel between the nodes 202-208 and the paging space 230 is utilized in non-grid or non-distributed computing. It can also be appreciated that system 200 has less subsystems or components than traditional distributed processing systems and system 200 can move more data, faster, with better security features than traditional systems. As stated above, unsecure communication channels between nodes 202, 204 and 208 can be reduced or eliminated as the nodes can have "direct memory access" to community memory provided by community paging space 230. The community paging space 230 can provide secure bulk data transactions and virtual memory services to nodes 202-208 via the VIOSs 210, 206 and 220. The paging space is referred to as community space in this embodiment to indicate that the application data in the paging space is available to the "community" of nodes 202-208.

In some embodiments, the system can form a grid. Each node 202-208 in the grid can be an LPAR that forms the grid, data grid or a computational grid. All the nodes 202-208 in a grid could access the same paging device (i.e. 230) or they could access different paging devices or stacks where each device or stack can be backed by at least one common paging device 230. The data and/or the results of a computation can be passed from one node to another using services provided by a VRM stack 117 including a virtual paging device driver (VPDD) a pager or page driver, a virtual asynchronous interface or the hypervisor, as discussed with reference to FIG. 1.

With the disclosed configuration a single master interfacing with multiple slaves can forego parsing, de-serializing, and encrypting because each master and slave can transact with the application and application data in native binary form. Also, since data is not retrieved and results are not sent across the network, the whole process can be fast, efficient and secure.

Figure 3:
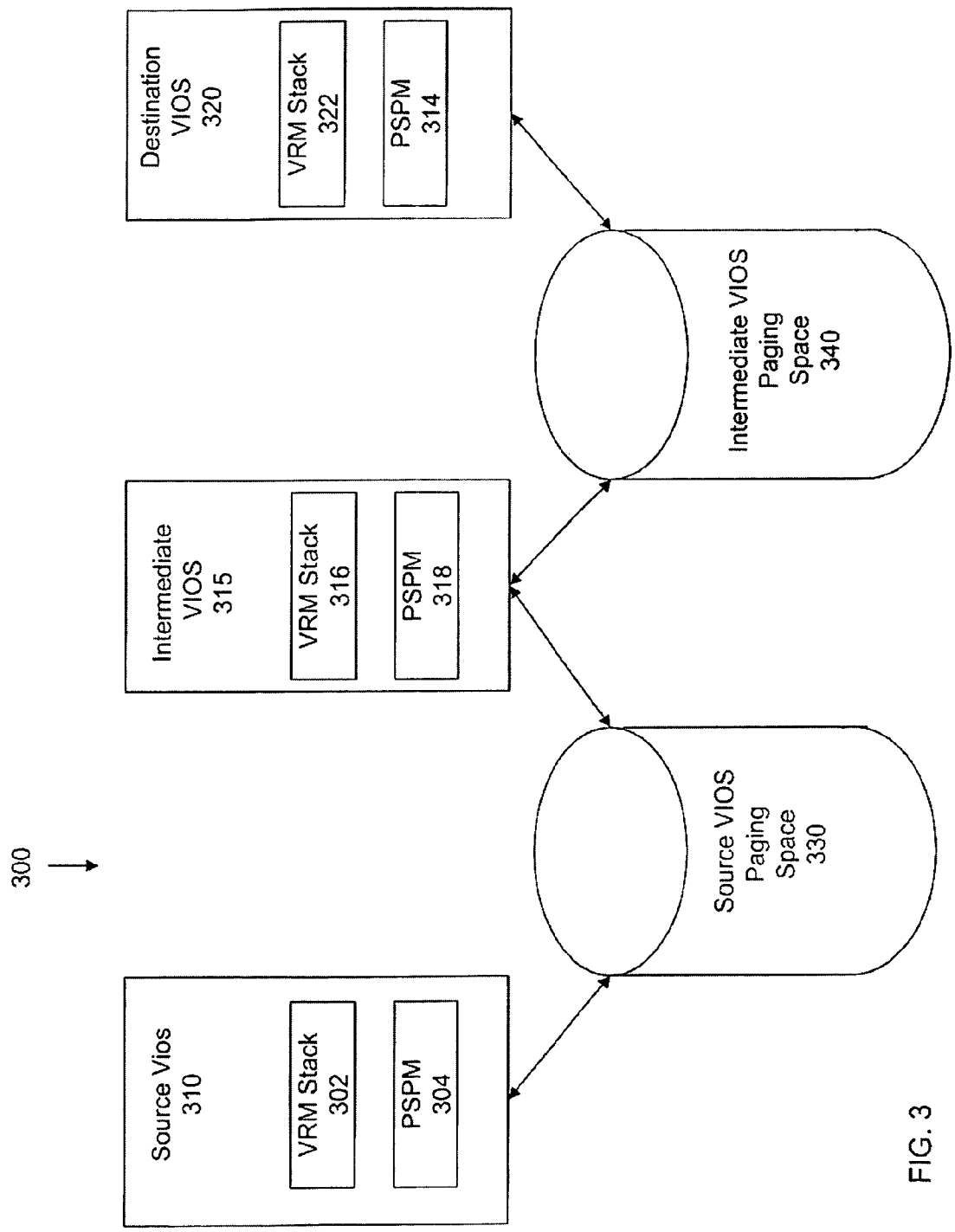
FIG. 3 is a block diagram of another distributed computing system that can share virtual memory.

Referring to FIG. 3, a distributed computing system 300 that can utilize a community virtual memory with paging features is depicted. The system 300 can include a destination VIOS that cannot achieve direct access to a source paging device utilized by a source VIOS. The system 300 can include source VIOS 310, destination VIOS 320, and common or intermediate VIOSs 315. Further, the system 300 can include local paging space 330 for the source VIOS 310 and a local paging space 340 for the destination VIOS 320. The source VIOS 310 can include a VRM stack 302 and a paging space partition module (PSPM) 304. The intermediate VIOS 315 can include a VRM stack 316 and a PSPM 318 and the destination VIOS 320 can include a VRM stack 322 and a PSPM 314.

Although not shown, the system 300 can have a work load splitter to split the workload for processing by nodes that are serviced by VIOSs 310, 315, and 320 as described with reference to FIG. 2. In some embodiments, the system 300 can be configured such that intermediate VIOS 315 facilitates communications between the source VIOS 310 and the destination VIOS 320.

In other embodiments, destination VIOS 320 (or another entity) can determine that the destination VIOS 320 cannot connect with the desired paging space (i.e. the source VIOS paging space 330). If this occurs, communications can be set up between the source VIOS paging space 330 and the destination VIOS 320 via an alternate path. The alternate path can be created by an intermediate VIOS 315 and intermediate paging space 340. The intermediate paging space 340 can be a conduit to facilitate communications between the destination VIOS 320 and the source VIOS 310 or source VIOS paging device 330. Accordingly, the system 300 can provide two local paging spaces 330 and 340 that can be accessed by intermediate node 315 where intermediate node 315 can facilitate communications between the destination node 320 and the/a source VIOS paging space 330. Such communication can be controlled by a hypervisor (not shown)

In some embodiments, when the destination VIOS 320 cannot directly access the source VIOS 310, the source VIOS 310 can be controlled to "page out" the contents of its VRM stack 302 via the PSPM 304. In some embodiments, where a processing node communicating through the source VIOS 310 produces results for a parsed task, the node can control the source VIOS 310 such that the source VIOS 310 pages out only the results from a processed task to the paging space 330.

The intermediate VIOS 315 via VRM stack 316 and PSPM 318 can move the data block or page out the results to the intermediate paging space 340 and the destination VIOS 320 can receive or page in the results via the VRM stack 322 and the PSPM 314. Although only one intermediate VIOS 315 is shown, some embodiments could utilize multiple intermediate nodes (not shown) forming a communication chain, such that each VIOS can access its "neighboring" VIOSs or neighboring VRM stack.

Figure 4:
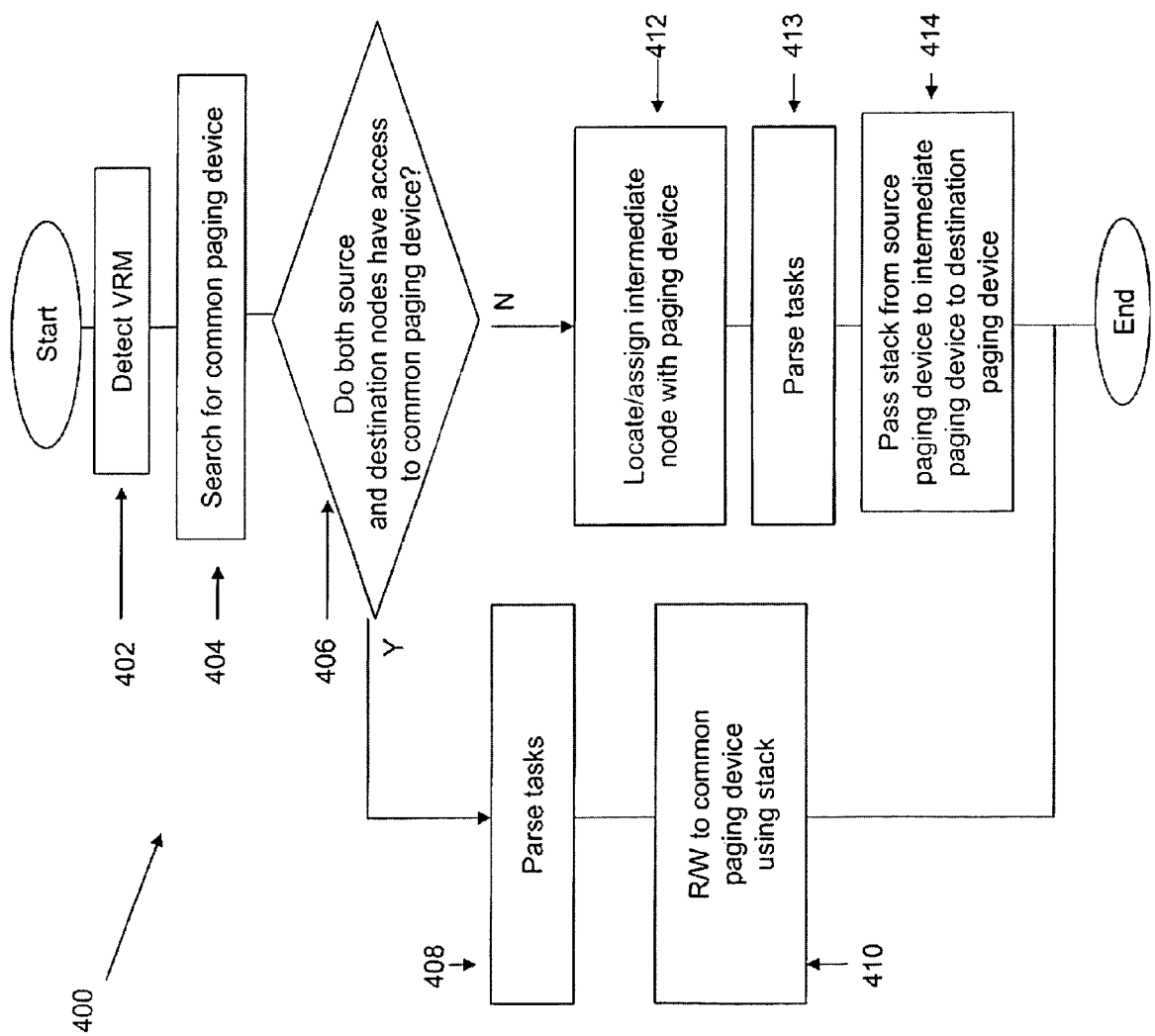
FIG. 4 is a flow diagram depicting a method for performing distributed computing utilizing virtual memory.

Referring to FIG. 4, a flow diagram 400 depicting a method for distributed computing with a virtual memory system is disclosed. As illustrated by block 402, the system can detect that it can be serviced by virtual memory and the system can be configured accordingly. As illustrated by block 404, a common paging device can be searched for. As illustrated by decision block 406, it can be determined if both a source VIOS and a destination VIOS can find a paging device that they both can access.

As illustrated by block 408, if a common node can be identified, communications can be set up between the nodes, VIOSs and the virtual memory and the workload or application can be parsed into tasks. As illustrated by block 410, the nodes can read and write to virtual memory utilizing a VIOS and virtual memory stacks while processing tasks of the application. The process can end thereafter.

If, at block 406 both the source and destination nodes do not have access to a common paging device, an intermediate VIOS node can facilitate an intermediate paging device, as illustrated by block 412. The workload can be parsed into tasks as illustrated by block 413 and the source node can send results to the destination node as a stack is passed from the source paging device to the intermediate paging devices and the intermediate paging device can send the stack to the destination paging device, as illustrated by block 414. The process can end thereafter.

Figure 5:
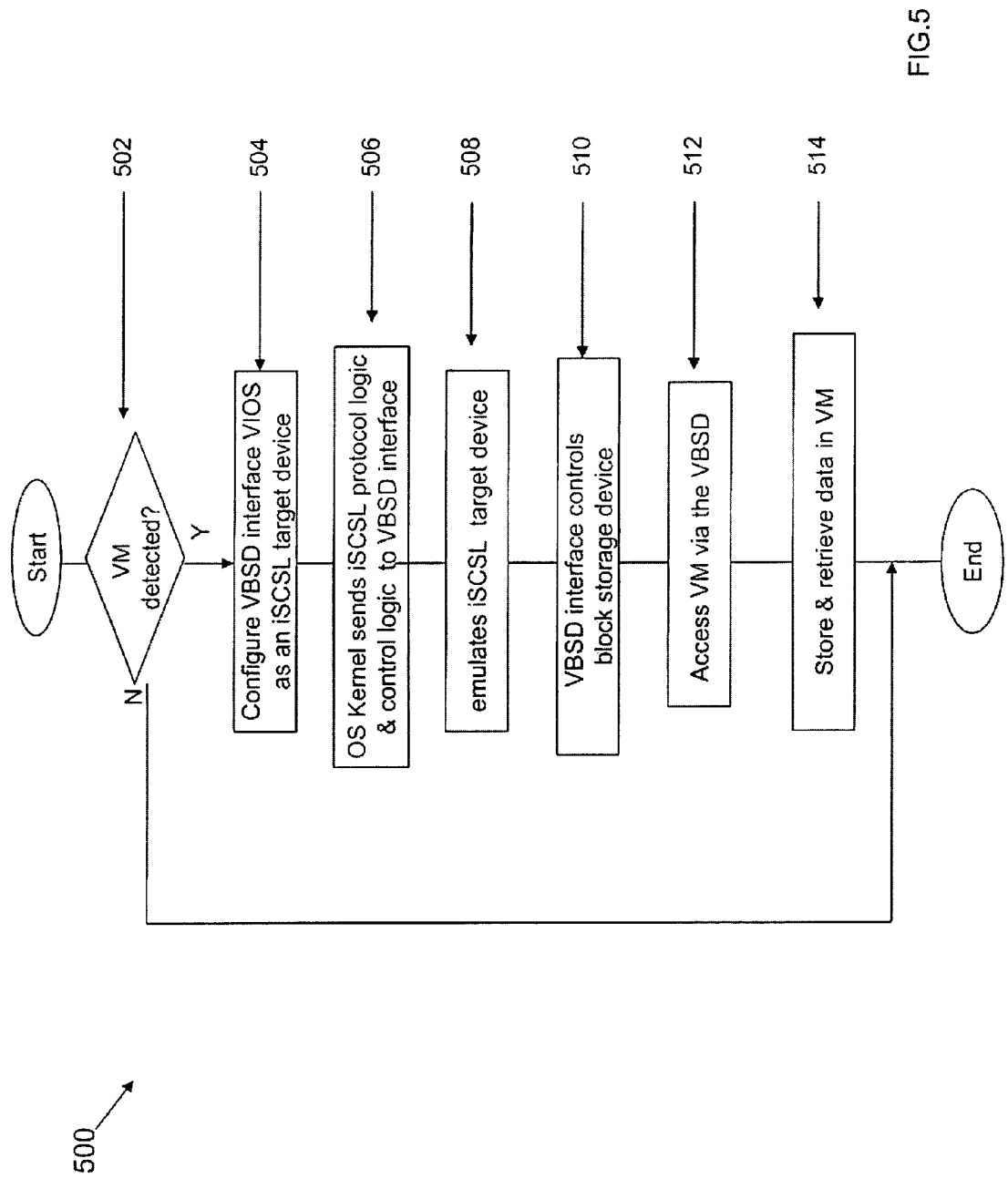
FIG. 5 is a flow diagram of a method describing operation of a block storage interface for virtual memory.

Referring to FIG. 5, a flow diagram 500 providing a method to operate a virtual memory utilizing a virtual block storage device interface is depicted. As illustrated by decision block 502, it can be determined if virtual memory is detected. If VM is not detected, the process can end. If VM is detected, a virtual input/output server (VIOS) can be configured with a virtual block storage device interface (VBSDI). In one embodiment, the VIOS can utilize an AIX® operating system (not shown) to implement the VBSDI.

As illustrated by block 506, an OS at a node that desires to access the virtual memory can send an iSCSI protocol and VBSDI control logic to the VBSDI of the VIOS. As illustrated by block 508, the VBSDI can emulate an iSCSI target device and provide an interface between the OS and the virtual memory utilizing the iSCSI protocol and VBSDI control logic.

In response to the protocol and control, the VBSDI and the VIOS can set up and control functions of the virtual memory, as illustrated by block 510. As illustrated by block 512, the OS can access the virtual memory via the VBSDI of the VIOS. Data can be stored in or retrieve from virtual memory as illustrated by block 514. The process can end thereafter.

The VBSD interface described is shown interfacing a virtual memory (VRM 120). The disclosed configuration is only one application for the VBSD interface. It can be appreciated that the VBSD interface could be utilized to drive any block I/O device. Further, the VBSD interface could be utilized without virtual memory or without the services of VRM 120.

In some embodiments a kernel extension driving the VBSD interface could be provided by the VRM 120. A pager, such as the pager in FIG. 1 can communicate with the VBSD interface and can change or modify paging requests and transactions between the VRM 120 and the VBSD interface.

In some embodiments an iSCSI module in the LPAR can act as an iSCSI target, and the iSCSI protocol can be received over the Internet, the iSCSI protocol could be translated or processed by the iSCSI module and the translated signal could drive the VBSD interface. The VBSD interface can be responsible for accessing and managing I/O and I/C devices. In some embodiments the VBSD interface may not be configured to accept the iSCSI protocol. In other embodiments the hypervisor can utilize the VBSD interface to access hardware (ex iSCSI) that the hypervisor is unfamiliar with.

The flow diagram for operating a VBSD interface could be simplified in many ways. In one embodiment, an initiator a virtual memory of an iSCSI can send an I/O request to the VBSD interface and the VBSD interface can communicate with native storage device drivers and the device drivers can pass down and send I/O to physical adapters. The physical adapters can send I/O to physical storage devices such as hard disks. A response to an I/O request could start from the disk and work its way back up to the initiator in the reverse order.

Generally an initiator can be a module that understands some type of logic or protocols that are specific to the function that the initiator is trying to support or emulate. For example, in the VRM the initiator VRM can emulate memory and paging of memory. In another example the iSCSI initiator can emulate an iSCSI target device.

Figure 6:
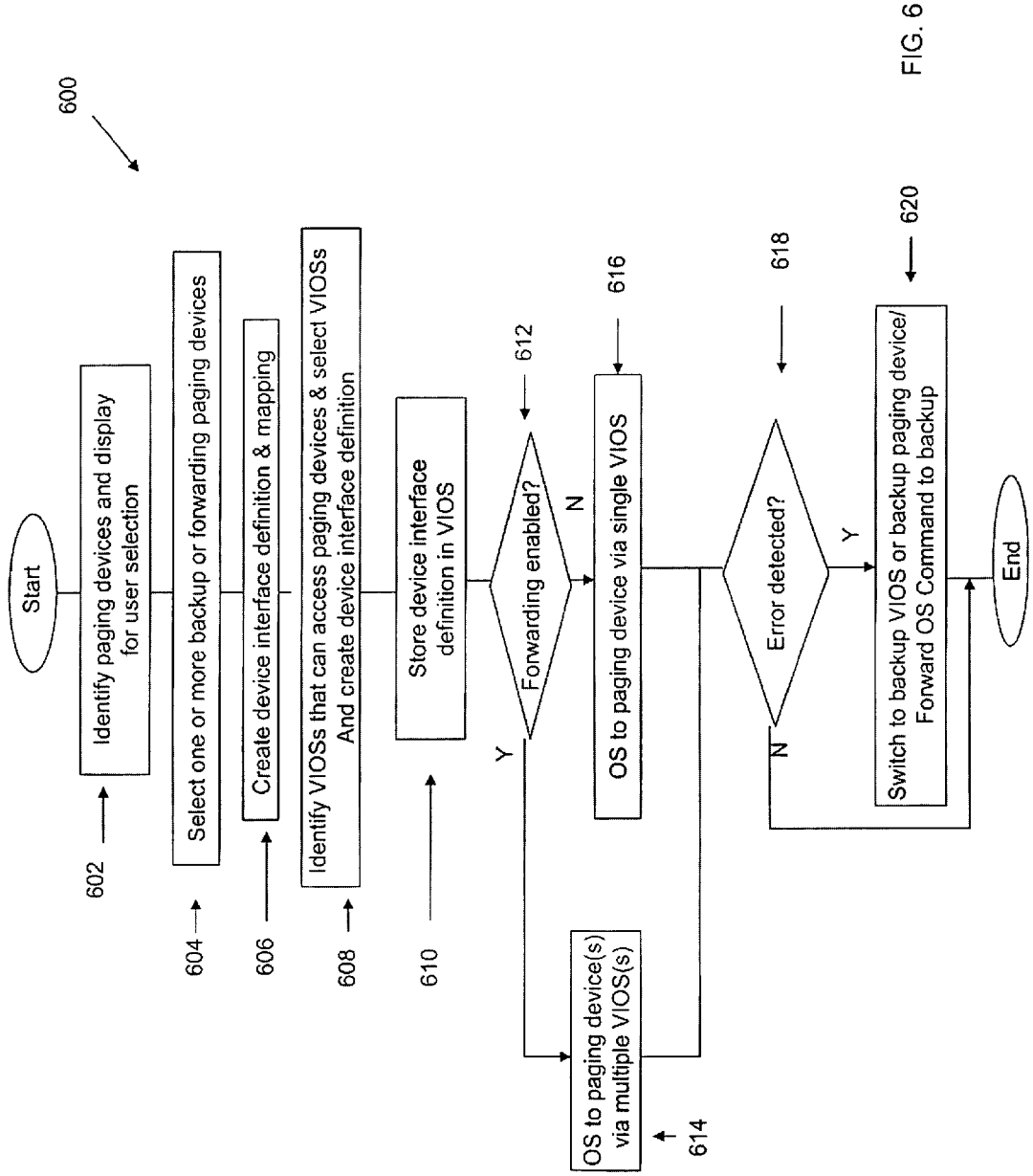
FIG. 6 is a flow diagram of a method for controlling I/O in a virtualized system.

Referring to FIG. 6, a flow diagram 600 depicting a method for controlling input-output (I/O) in a virtualized system is disclosed. As illustrated by block 602, a paging space partition manager (PSPM) can identify paging devices connected to the system and in some embodiments identified or available paging devices can be displayed for user selection. As illustrated by block 604, one or more paging devices can be selected for an OS and one or more back-up paging devices or forwarding paging devices can be selected for the OS. The back-up paging devices can be given an order or a ranking such that in the event of a failure a first back-up will be activated and if the first back up is unavailable or has failed, the system will try the second back-up and so on.

A paging device could be a stack in a PSPM system or could be a block I/O device such as a virtual memory or a disk drive configured as a block storage device. Thus, any hardware or software that transacts in block increment could be the identified paging device. As illustrated by block 606, a device interface definition can be created for OSs, primary VIOSs, back up VIOSs, primary paging devices/entities, back up paging devices/entities, logical memory allocations in VRM 120 etc. and the device interface definition can define preferred communication channels and preferred back up channels that can be implemented when congestion or a failure occurs As illustrated by block 608, a VIOS can be identified for the OS and the selected paging device. The VIOS paging device OS identification can be done via user input or by an automated selection process. The automated identification process can be based on physical connections, proximity factors, capabilities, configurations, workload, etc. After the identification process, a primary VIOS and back up VIOSs can be selected and a device interface definition can be created for each of the devices, as also illustrated in block 608.

The device interface definition can include a logical unit number (LUN) a logical address, a media access control address, a handle, an interface definition, a shared logical unit number, a label, state of the device information, etc. This information can be stored at one or more locations, such as at the VIOS. The information can be utilized by one or more OSs, firmwares or hypervisors, a VIOS, a PMPM, virtual memories, paging devices, block I/O devices, block storage devices, etc. to route and re-route communications.

In one embodiment, as illustrated in block 619, the device interface definition can be stored at the VIOS, however, the device interface definition could be stored at many other locations that might utilize such a definition. As illustrated by block 612, the OS can interact with the virtual memory based on user or auto selections discussed above. As illustrated by decision block 612, it can be determined if forwarding is enabled. If forwarding is enabled, the communication can be forwarded to one or more paging devices, as illustrated by block 614. If forwarding is not enabled, then the OS can send to a paging device via a single VIOS, as illustrated in block 616.

As illustrated by block 618, if an error is detected, the system can switch to a back-up configuration that utilizes one or more back up VIOSs or a back-up paging device, or both as illustrated by block 620. As also illustrated by block 620, in some embodiments, the OS communications could be set to forward communications to another VIOS, another paging device or both. Such a forwarding could be for redundancy, back up or maintenance purposes. The process could end thereafter.

The process described with blocks 602-614 can operate without the error detection and back up switching as described in blocks 618 and 620. Thus, the process described utilizing blocks 602-614 could be a separate process from the process described in blocks 618 and 620. The process described by blocks 618 and 620 can operate as on infinite loop that can continuously monitor communication activities and exit when the partition that it is servicing shuts down.

Figure 7:
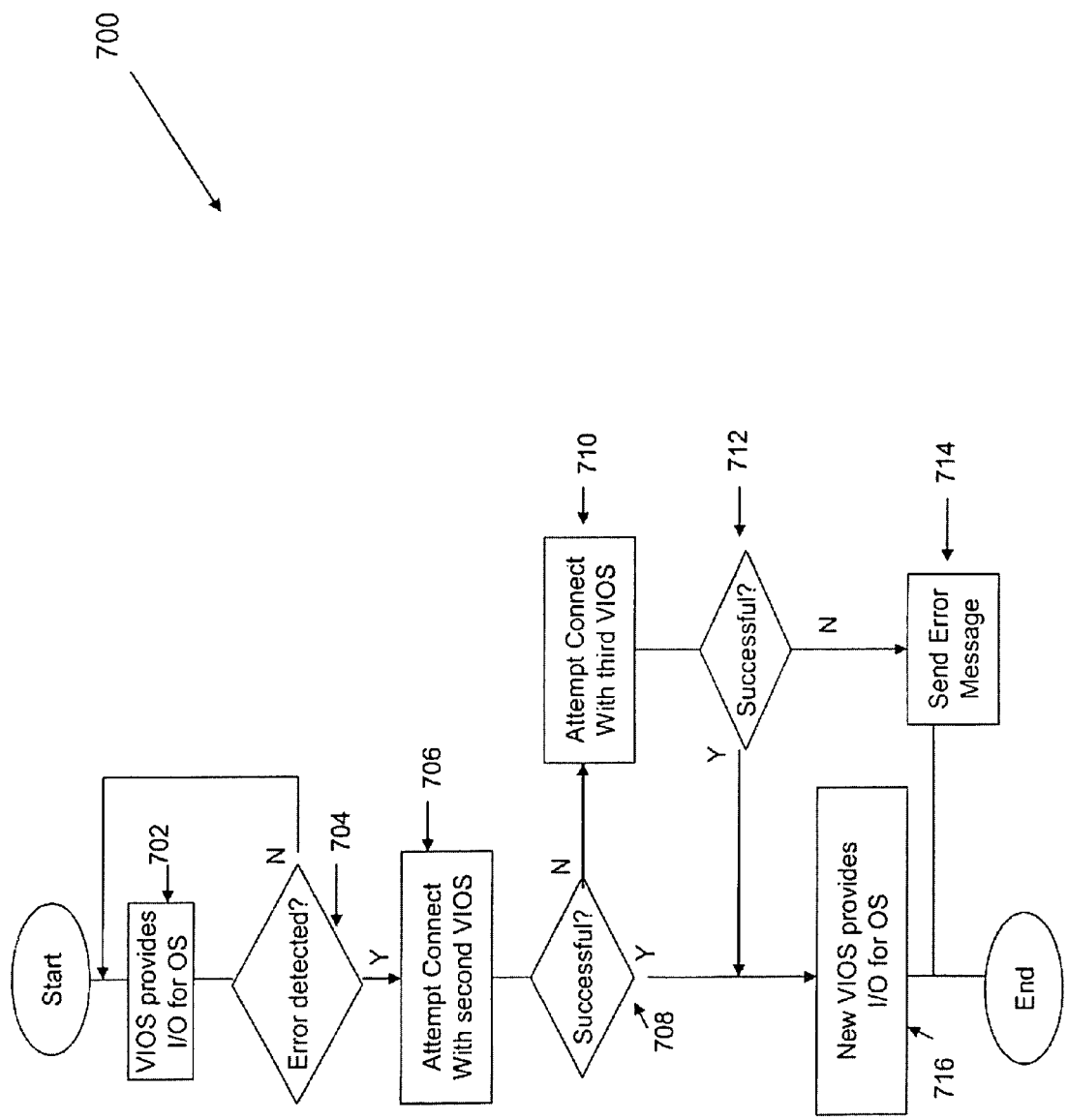
FIG. 7 is a flow diagram of a another method for controlling I/O in a virtualized system.

Referring to FIG. 7, a flow diagram 700 depicting another method for controlling input output (I/O) in a virtualized system is disclosed. As illustrated by block 702, input-output (I/O) services can be provided for an operating system by a VIOS. As illustrated by block 704, it can be determined if a communication error can be detected. If no error is detected, the process can continue providing communication services. If a communication error is detected, the OS or the hypervisor can attempt to connect to a second or back up VIOS as illustrated by block 706.

As illustrated by block 708, it can be determined if such an attempt is successful and if the attempt is successful, the second or back up VIOS can provide I/O for the OS. If at block 708 the attempt was not successful, the system can attempt to connect to a third VIOS. As illustrated by block 712, it can be determined if the third VIOS can successfully communicate with a paging device and if so, the third VIOS can provide I/O for the OS. If the third VIOS cannot successfully provide I/O for the OS, an error message can be sent, as illustrated by bock 714. The process can end thereafter.

Figure 8:
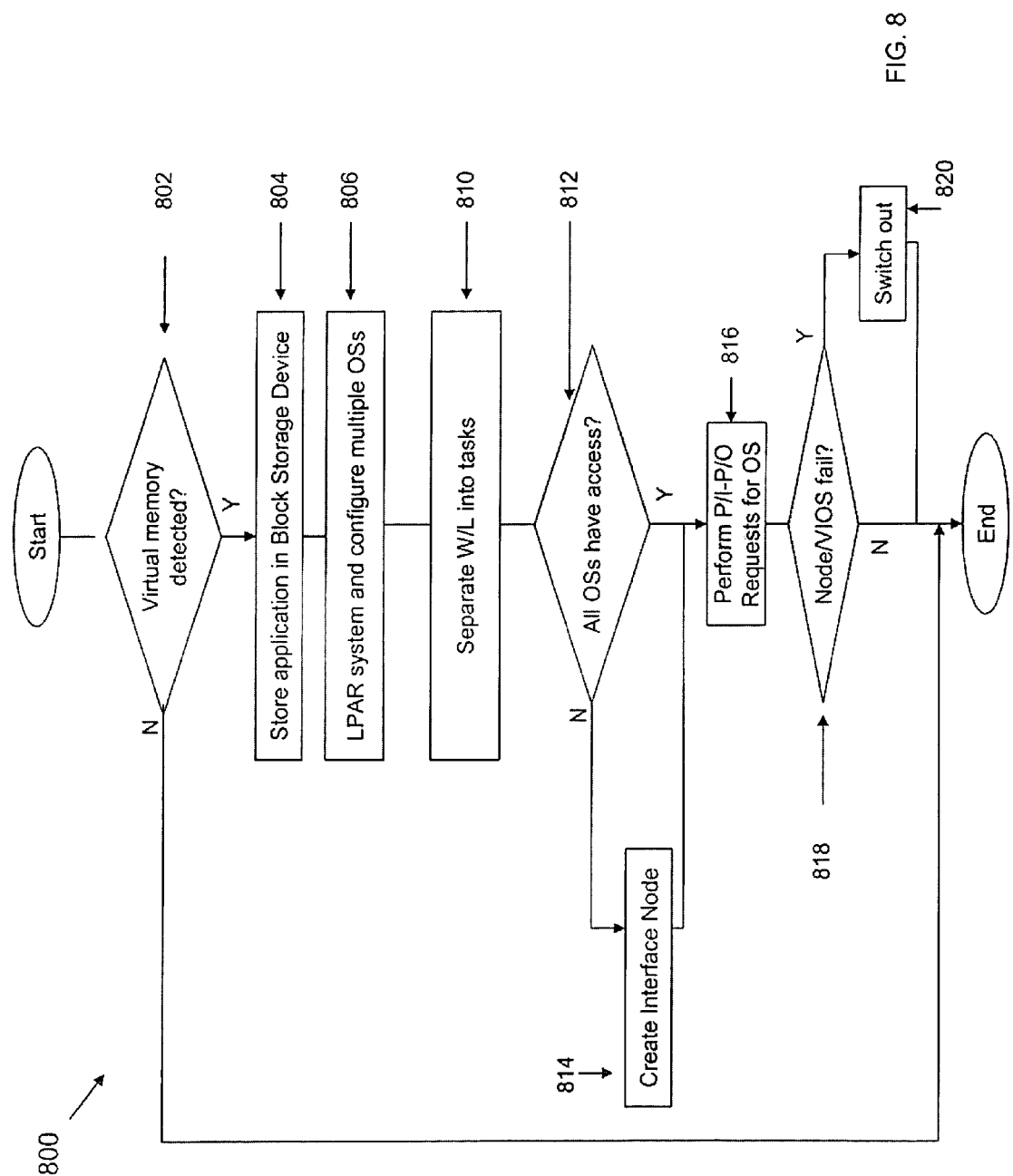
FIG. 8 is a flow diagram of a method describing operation of a block storage interface for virtual memory.

Referring to FIG. 8, a flow diagram 800 depicting a method for sharing data utilizing a virtual memory is disclosed. As illustrated by decision block 802, it can be determined if the system has virtual memory resources. If no virtual memory is detected the process can end, however if virtual memory is detected, an application can be stored in a block storage device, as illustrated in block 804.

As illustrated in block 806, a system can be logically partitioned and multiple operating systems can be configured for grid computing. As illustrated by block 810, the processing workload of the application can be separated into tasks. As illustrated by decision block 812, it can be determined if all OSs have access to the virtual memory. If some OSs do not have access to virtual memory, an interface node can be created, as illustrated by block 814.

If all selected OSs have access to virtual memory, as illustrated by block 816 the OSs can request and the virtual memory can provide page in and page out (P/I-P/O) functions such that all OSs can utilize the same data in virtual memory. As illustrated by decision block 818, it can be determined if a node or a VIOS has failed. If a node or VIOS has failed, the node or VIOS can be switched Out as illustrated by block 820 and the process can end. Also, if there are no failures the process can continue until the application terminates and the process can end.

Figure 9:
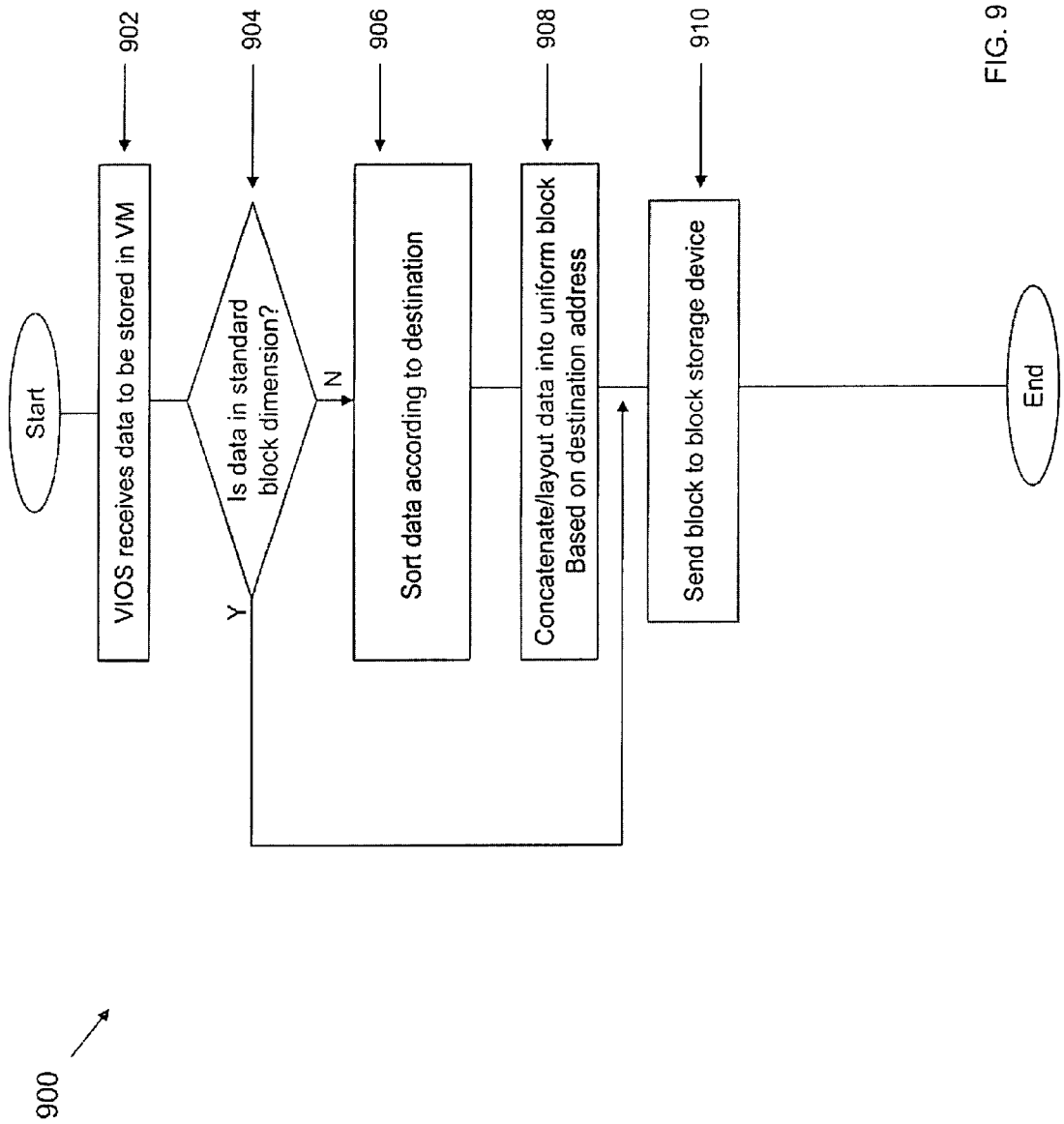
FIG. 9 is a flow diagram depicting a method of storing non-uniform data segments.

Referring to FIG. 9, a flow diagram 900 depicting a method for storing blocks of data having different dimensions is disclosed. As illustrated by block 902, a VIOS can receive data to be stored in a paging device such as virtual memory. As illustrated by decision block 904, it can be determined if the data is in standard block dimensions. If the data is in standard block dimensions, then the blocks can be sent to a block storage device, as illustrated by block 910, and the process can end.

If at decision block 904, the data in not in standard dimensions, the data can be sorted according to its destination as illustrated by block 906. As illustrated by block 908, the sorted data can be concatenated or laid out on a page or a block in an effort to fill the block to a predetermined capacity. However, if there are timing constraints or the page has been partially full for a predetermined amount of time, the page can be sent to memory without being filled. The block can be sent to a block storage device, as illustrated by block 910, and the process can end thereafter.

Figure 10:
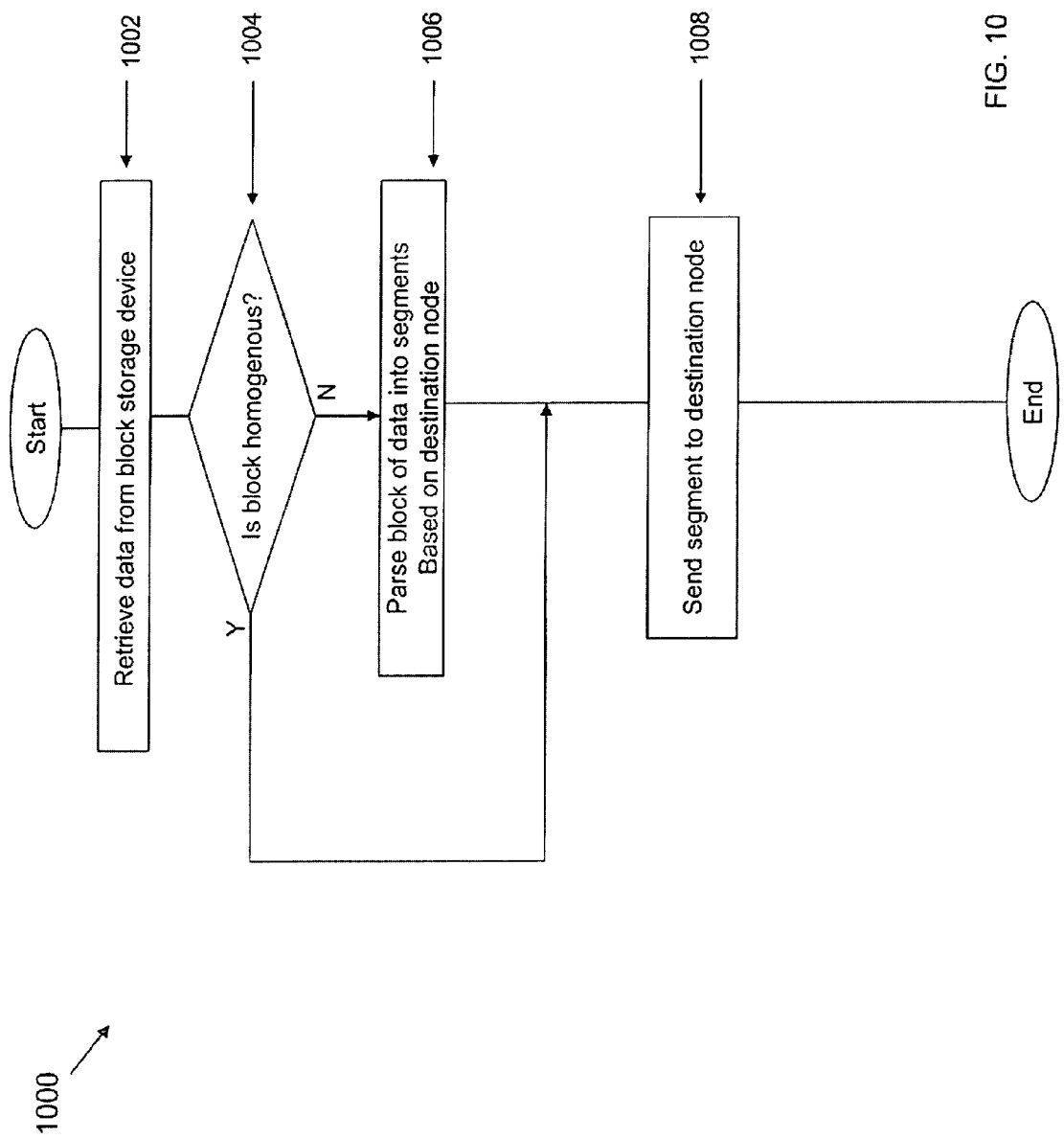
FIG. 10 is a now diagram depicting a method of retrieving non-uniform data segments.

Referring to FIG. 10, a flow diagram 1000 depicting a method for retrieving blocks of data having non-standard data dimensions is disclosed. As illustrated by block 1002, data can be received from block storage. As illustrated by decision block 1004, it can be determined if the block is homogeneous or if the block has data segments that are destined for different locations.

If the block is homogeneous, the segments can be sent to the destination node, as illustrated by block 1008, and the process can end. If at decision block 1004 the block is not homogeneous, the block of data can be parsed according to a destination indicator, as illustrated by block 1006 and the data can be sent to the destination node, as illustrated by block 1008. The process can end thereafter.

Embodiments may take the form of an entirely hardware embodiment, an entirely software embodiment or an embodiment containing both hardware and software elements. An embodiment that is implemented in software may include, but is not limited to, firmware, resident software, microcode, etc.

Furthermore, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

The invention claimed is:

1. A method comprising:
   identifying a first node configured to process an application;
   identifying paging space accessible to the first node;
   identifying a second node configured to share paged data with the first node;
   transacting the paged data between the first node and the identified paging space;
   accessing, by the second node, the paged data from the paging space, wherein the paging space is a paging space of a virtual memory associated with at least one of the first node or the second node, and wherein the first node and second node are configured to share data in a same paging space of the virtual memory;
   determining if the second node cannot access the identified paging space directly; and
   locating an intermediate node having an intermediate node paging space, of a virtual memory associated with the intermediate node, configured to facilitate sharing of the data between the first and second node in response to determining that the second node cannot access the identified paging space directly.

2. The method of claim 1, wherein the intermediate node paging space is linked to the identified paging space via a virtual input output server.

3. The method of claim 1, wherein the application has a workload that is split into tasks and the first node and the second node utilize the paging space to process the split tasks.

4. The method of claim 3, wherein the first and second node are configured to utilize the paging space to store results of the split tasks.

5. The method of claim 1, wherein a hypervisor facilitates transacting the paged data between the first node and the identified paging space.

6. The method of claim 1, wherein the intermediate node is granted access to data in the paging space and access to data in the intermediate node paging space such that the intermediate node copies data from the paging space to the intermediate node paging space.

7. The method of claim 1, further comprising, in response to a determination that the second node cannot access the identified paging space directly:
   controlling the first node to page out contents of a virtual real memory (VRM) stack of the first node to the paging space to thereby generate paged out contents; and
   moving the paged out contents of the VRM stack from the paging space to the intermediate node paging space.

8. The method of claim 7, further comprising, in response to the determination that the second node cannot access the identified paging space directly:
   paging in the paged out contents of the VRM stack from the intermediate node paging space to a destination paging space of the second node.

9. The method of claim 7, wherein the contents of the VRM stack that are paged out comprise only results of a parsed task of the application processed by the first node.

10. The method of claim 1, further comprising:
    transferring the data from the intermediate node paging space of the intermediate node to one or more second intermediate node paging spaces of one or more second intermediate nodes prior to providing the data to the second node.

11. The method of claim 1, wherein determining if the second node cannot access the identified paging space directly comprises determining whether a destination virtual input/output server (VIOS) of the second node can directly access a source VIOS of the first node.

12. A system comprising:
a first node configured to process an application;
a paging space partition module configured to allocate page space to the first node; and
a virtual input output server configured to support the first node in processing the application and to grant access to the page space by the first node and a second node, wherein the page space is a page space of a virtual memory of a virtual memory system, and wherein the first node and second node are configured to share data in the page space of the virtual memory, wherein the virtual input output server is configured to:
determine if the second node cannot access the identified paging space directly; and
locate an intermediate node having an intermediate node paging space, of a virtual memory associated with the intermediate node, configured to facilitate sharing of the data between the first and second node in response to determining that the second node cannot access the identified paging space directly.

13. The system of claim 12, wherein the first node produces a result based on a task of the application and the virtual input output server receives the result and sends the result to the page space of the virtual memory utilizing the paging space partition module.

14. The system of claim 12, further comprising a second virtual input output server configured to access the virtual memory system and retrieve the result via a second paging space partition module.

15. The system of claim 14, wherein the second node receives the result from the second virtual input output server, utilizes the result to produce a second result, and sends the second result to the page space.

16. The system of claim 14, further comprising a hypervisor configured to facilitate communications between the first virtual input output server and the second virtual input output server.

17. The system of claim 12, wherein the paging space partition module comprises an asynchronous services interface.

18. The system of claim 12, further comprising a second virtual input output server to configure communications with the second node.

19. The system of claim 12, further comprising a virtual memory manager configured to accept controls from a hypervisor module and to store the contents in the page space.

20. The system of claim 12, further comprising a stack wherein the paging space partition module utilizes the stack to move application related data and results to facilitate distributed computing between the first and second nodes.

21. The system of claim 12, further comprising a pager to facilitate paging information.

22. A computer program product comprising a computer readable storage medium having a computer readable program stored therein, wherein the computer readable program, when executed on a computing device, causes the computing device to:
process, by a first node, an application;
allocate, by a paging space partition module, page space to the first node;
grant, by a virtual input output server, access by the first node and a second node to the page space, wherein the page space is a page space of a virtual memory of a virtual memory system, and wherein the first node and second node share data in the page space of the virtual memory;
determine if the second node cannot access the page space directly; and
locate an intermediate node having an intermediate node paging space, of a virtual memory associated with the intermediate node, to facilitate sharing of the data between the first and second node in response to determining that the second node cannot access the identified page space directly.

23. The computer program product of claim 22, wherein the computer readable program, in response to a determination that the second node cannot access the identified paging space directly, further causes the computing device to:
control the first node to page out contents of a virtual real memory (VRM) stack of the first node to the paging space to thereby generate paged out contents; and
move the paged out contents of the VRM stack from the paging space to the intermediate node paging space.

* * * * *